(12) United States Patent
Kasai

(10) Patent No.: US 10,296,697 B2
(45) Date of Patent: May 21, 2019

(54) INTERFERENCE CHECK SYSTEM

(71) Applicant: LANDMARK TECHNOLOGY CORPORATION, Tokyo (JP)

(72) Inventor: Toshiaki Kasai, Tokyo (JP)

(73) Assignee: LANDMARK TECHNOLOGY CORPORATION, Tokyo (JP)

( * ) Notice: Subject to any disclaimer, the term of this patent is extended or adjusted under 35 U.S.C. 154(b) by 161 days.

(21) Appl. No.: 15/314,093

(22) PCT Filed: May 27, 2015

(86) PCT No.: PCT/JP2015/065238
§ 371 (c)(1),
(2) Date: Nov. 27, 2016

(87) PCT Pub. No.: WO2015/182654
PCT Pub. Date: Dec. 3, 2015

(65) Prior Publication Data
US 2017/0193149 A1    Jul. 6, 2017

(30) Foreign Application Priority Data

May 28, 2014    (JP) ................................. 2014-109947

(51) Int. Cl.
*G06F 17/50* (2006.01)

(52) U.S. Cl.
CPC .......... *G06F 17/5077* (2013.01); *G06F 17/50* (2013.01); *G06F 17/5009* (2013.01); *G06F 17/5045* (2013.01); *G06F 17/5081* (2013.01); *G06F 17/5068* (2013.01); *G06F 2217/04* (2013.01); *G06F 2217/36* (2013.01)

(58) Field of Classification Search
USPC .......................................................... 716/126
See application file for complete search history.

(56) References Cited

U.S. PATENT DOCUMENTS

2012/0173207 A1\*    7/2012    Abe .................... G06F 17/5095
                                                              703/1

FOREIGN PATENT DOCUMENTS

| JP | 2006059245 |   | 3/2006 |
|----|------------|---|--------|
| JP | 2006134297 |   | 5/2006 |
| JP | 2009059325 A | * | 3/2009 |
| JP | 4266783 |   | 5/2009 |
| JP | 4641033 |   | 3/2011 |
| JP | 2011165096 |   | 8/2011 |
| JP | 4928528 |   | 5/2012 |

\* cited by examiner

*Primary Examiner* — Eric D Lee
(74) *Attorney, Agent, or Firm* — Steven M. Greenberg, Esq.; Shutts & Bowen LLP

(57) ABSTRACT

The present invention aims to increase the accuracy of an interference check and is characterized by including: a movable range calculation unit that, in a wiring model which is a three-dimensional shape model of wiring in three-dimensional model data, sets two fixed points in the wiring model as focal points and generates a set of predetermined points such that the sum of a distance from one of the focal points to a predetermined point and a distance from the other of the focal points to the predetermined point becomes the length of the wiring model; a movable range list generator that sets the inside of the set of predetermined points as a movable range of the wiring; and a display step unit that causes the set movable range to be displayed on a display unit.

3 Claims, 22 Drawing Sheets

FIG. 8
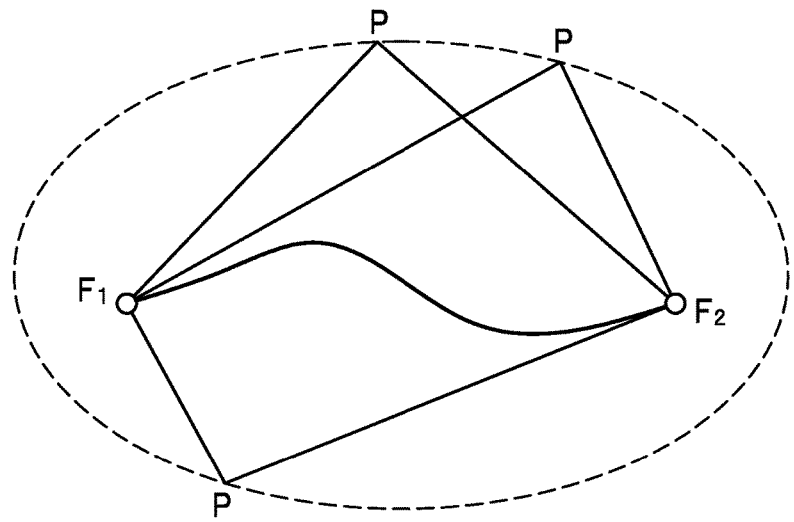
FIG. 9
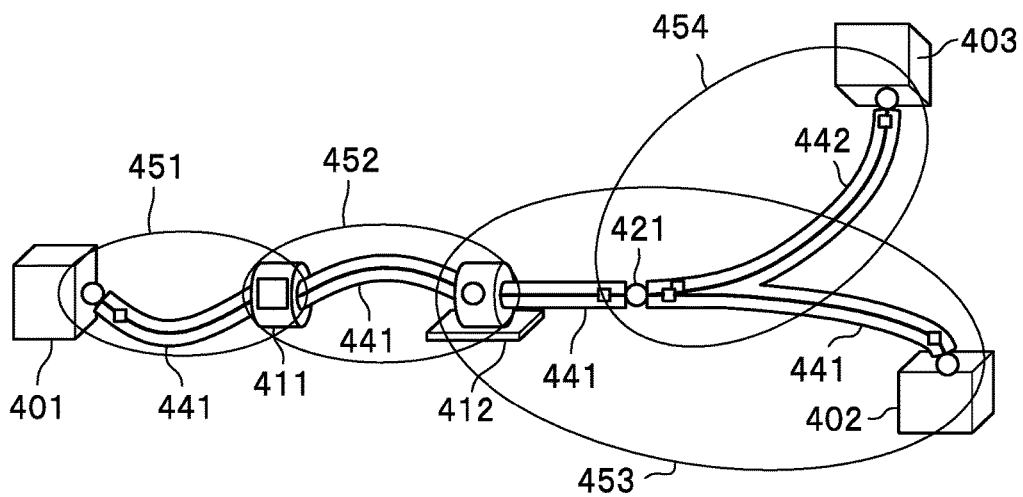
FIG. 10
| WIRING IDENTI-FICATION NUMBER | FIRST FIXED POINT COORDINATE | SECOND FIXED POINT COORDINATE | WIRING LENGTH |
|---|---|---|---|
| A1 | (10, 20, 25) | (15, 40, 15) | 30 |
| A2 | (103, 125, 30) | (154, 105, 30) | 60 |
| ⋮ | ⋮ | ⋮ | ⋮ |
125

| COMPONENT IDENTIFICATION NUMBER | POLYGON INFORMATION | SIDE INFORMATION | EDGE FLAG |
|---|---|---|---|
| B1 | PL11 | a1-1 | |
| B1 | PL11 | a1-2 | |
| B1 | PL11 | a1-3 | |

126

| COMPONENT IDENTIFICATION NUMBER | POLYGON INFORMATION | SIDE INFORMATION | EDGE FLAG |
|---|---|---|---|
| B1 | PL11 | a1-1 | |
| B1 | PL11 | a1-2 | |
| B1 | PL11 | a1-3 | |
| B1 | PL21 | a2-1 | |
| B1 | PL21 | a2-2 | |
| ~~B1~~ | ~~PL22~~ | ~~a2-3~~ | |

126

| COMPONENT IDENTIFICATION NUMBER | POLYGON INFORMATION | SIDE INFORMATION | EDGE FLAG |
|---|---|---|---|
| B1 | PL11 | a1-1 | |
| B1 | PL11 | a1-2 | |
| B1 | PL11 | a1-3 | ○ |
| B1 | PL21 | a2-1 | |
| B1 | PL22 | a2-2 | |

126

| EDGE IDENTIFICATION NUMBER | COMPONENT IDENTIFICATION NUMBER | EDGE INFORMATION |
|---|---|---|
| E1 | B1 | (PL11, a1-3) (PL13, a3-3) ⋮ |
| ⋮ | ⋮ | ⋮ |

128

| FIRST COMPONENT IDENTIFICATION NUMBER | FIRST POLYGON INFORMATION | SECOND COMPONENT IDENTIFICATION NUMBER | SECOND POLYGON INFORMATION |
|---|---|---|---|
| B3 | PL31 | B4 | PL41 |
| B3 | PL33 | B4 | PL44 |
| ⋮ | ⋮ | ⋮ | ⋮ |

129

| WIRE STUCK SURFACE IDENTIFICATION NUMBER | FIRST COMPONENT IDENTIFICATION NUMBER | SECOND COMPONENT IDENTIFICATION NUMBER | POLYGON SET INFORMATION |
|---|---|---|---|
| H1 | B3 | B4 | (PL31, PL41)<br>(PL33, PL44)<br>⋮ |
| ⋮ | ⋮ | ⋮ | ⋮ |

FIG. 21A

| WIRING IDENTIFICATION NUMBER | CHECK TARGET IDENTIFICATION NUMBER | DIVISION UNIT IDENTIFICATION NUMBER | WIRING SIDE POLYGON IDENTIFICATION NUMBER | WIRING SIDE COORDINATE | CHECK TARGET SIDE POLYGON IDENTIFICATION NUMBER | CHECK TARGET SIDE COORDINATE |
|---|---|---|---|---|---|---|
| A1 | E1 | | | | | |
| ... | ... | | | | | |
| A1 | H1 | | | | | |
| ... | ... | | | | | |

| WIRING IDENTIFICATION NUMBER | CHECK TARGET IDENTIFICATION NUMBER | DIVISION UNIT IDENTIFICATION NUMBER | WIRING SIDE POLYGON IDENTIFICATION NUMBER | WIRING SIDE COORDINATE | CHECK TARGET SIDE POLYGON IDENTIFICATION NUMBER | CHECK TARGET SIDE COORDINATE |
|---|---|---|---|---|---|---|
| A1 | E1 | SA11 | PL101 | (150, 160, 20) | PL205 | (153, 191, 105) |
| A1 | E1 | SA12 | PL113 | (163, 171, 30) | PL216 | (167, 185, 105) |
| A1 | E1 | SA13 | PL125 | (171, 164, 25) | PL225 | (185, 189, 105) |
| ... | ... | ... | ... | ... | ... | ... |
| A1 | H1 | SA11 | PL105 | (153, 162, 25) | PL303 | (213, 231, 201) |
| A1 | H1 | SA12 | PL116 | (165, 174, 29) | PL315 | (225, 246, 201) |
| ... | ... | ... | ... | ... | ... | ... |

~130

801, 802, 803

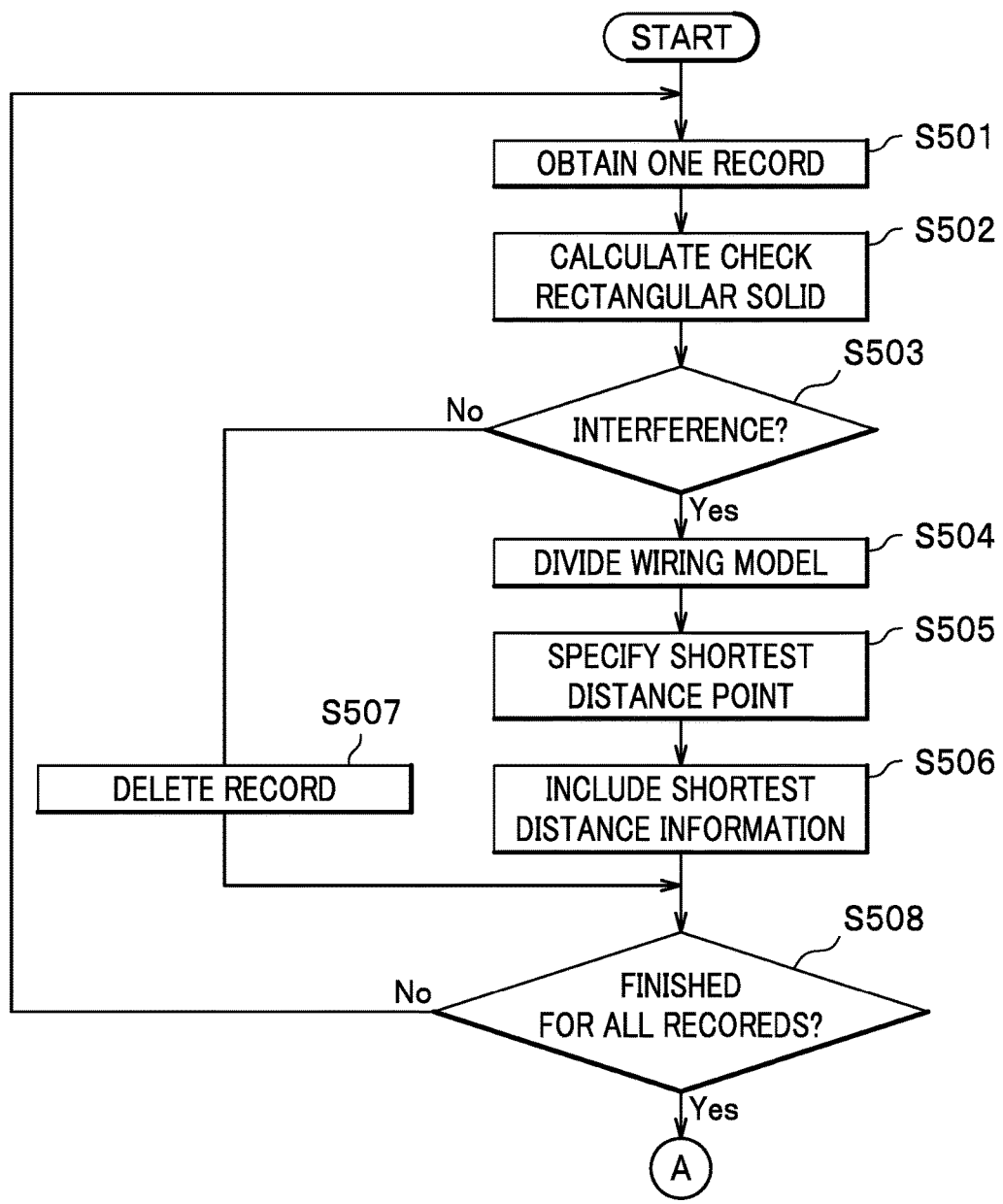

INTERFERENCE CHECK SYSTEM

CROSS-REFERENCE TO RELATED APPLICATIONS

This application is a Submission Under 35 U.S.C. § 371 for U.S. National Stage Patent Application of International Application Number PCT/JP2015/065238, filed May 27, 2015 and entitled "INTERFERENCE CHECK SYSTEM," which is related to and claims priority under 35 U.S.C. § 119 to Japanese Patent Application Serial Number 2014-109947, filed on May 28, 2014, and entitled "INTERFERENCE CHECK SYSTEM," the teachings of both are incorporated herein by reference in their entirety.

BACKGROUND OF THE INVENTION

Field of the Invention

The present invention relates to a technique of interference check system of checking interference of three-dimensional models.

Discussion of the Background

In wiring design mainly for substrate, it is desirable that interference check is performed by a computer in a design phase, mainly with, for example, three-dimensional CAD (3 Dimension-Computer Aided Design).

In relation to such a technique, for example, techniques described in Japanese Patent Application Nos. 4641033, 4928528 and 4266783 are disclosed. Here, in the technique described in Japanese Patent Application No. 4641033, a wire harness (wiring) is firstly divided into a plurality of nodes. And, each of the nodes is located as a vertex of a triangle having a straight line connecting the constraint points (fixing tools) which constrain the wire harness as a base side, and lengths of lines on both sides of each of the nodes as two sides. Thereby, the technique described in Japanese Patent Application No. 4641033 calculates a movable range of the wire harness.

Further, the technique described in Japanese Patent Application No. 4928528 moves each node of the wire harness constrained by an actual constraint relative to the movable range of the wire harness calculated in the procedure similar to the technique described in Japanese Patent Application No. 4641033 so as to correct condition data by using a regression expression found from the measured movable range in advance obtained.

Furthermore, the technique described in Japanese Patent Application No. 4266783 deforms the wire harness so that it passes through points indicated on a screen by a user. And, the technique described in Patent Document 3 determines whether the deformed wire harness interferes with other components.

SUMMARY OF THE INVENTION

The technique described in Japanese Patent Application Nos. 4641033 and 4928528 may calculate, for example, the movable ranges located on perpendicular lines to straight lines connecting constraints tools, however the technique doesn't calculate the movable ranges other than the above. In other words, when the length of a wiring is sufficiently longer than the length of a straight line connecting constraint tools, a wiring 1201 interferes with extended ends of the straight line connecting constraint tools 1211 and 1212 as shown in FIG. 29 so that there is a risk of causing the malfunction, which is not described in Japanese Patent Application Nos. 4641033 and 4928528. Thus, it cannot be said that the movable range is calculated well by the technique described in Japanese Patent Application Nos. 4641033 and 4928528.

Further, Japanese Patent Application Nos. 4641033 and 4928528 don't describe how to utilize the calculated movable range.

Furthermore, it is not clear about the technique described in Patent Document 3 that a determination whether the deformed wire harness interferes with the other components is performed by a computer or by a person. Even if the determination is performed by the computer, the user needs to designate via points of a wiring so that, when there are many kinds of wirings and components, the burden on the user increases.

The present invention has been made in consideration of such a background to improve facilitation in interference check.

Solution to Problem

In order to solve the foregoing problem, the present invention is characterized by setting two fixed points in a wiring model as focal points and generating a set of predetermined points such that the sum of a distance from one of the focal points to a predetermined point and a distance from the other of the focal points to a predetermined point becomes the length of the wiring model.

Advantageous Effects of the Invention

The present invention enables facilitating interference check.

BRIEF DESCRIPTION OF THE DRAWINGS

The present invention is described in detail below with reference to the attached drawing figures, wherein:

FIG. 8 is a drawing showing a method of calculating a movable range of a wiring according to the present embodiment.

FIG. 9 is a drawing showing an example of movable ranges of wirings according to the present embodiment.

FIG. 10 is a table showing an example of movable range list data according to the present embodiment.

FIG. 14 is a drawing showing a procedure of edge detection step according to the present embodiment.

FIG. 17 is a drawing showing a procedure of wire stuck surface detection step according to the present embodiment. FIG. 17B is a side view showing two polygons disposed in parallel with each other and in contact with each other, while FIG. 17C is a side view showing one of two polygons inclined relatively to the other polygon while contacting with each other.

FIG. 21 is a table showing an example of check pair list data according to the present embodiment, and FIG. 21A is a table showing the example of the check pair list data after check pair list data generation step is finished, and FIG. 21B is a table showing an example of the check pair list data directly before shielding check is started.

FIG. 22 is a flowchart showing a procedure of clearance checking step according to the present embodiment (Part 1).

FIG. 26 is a drawing showing a method of shielding check according to the present embodiment.

DESCRIPTION OF THE EMBODIMENTS

Figure 1:
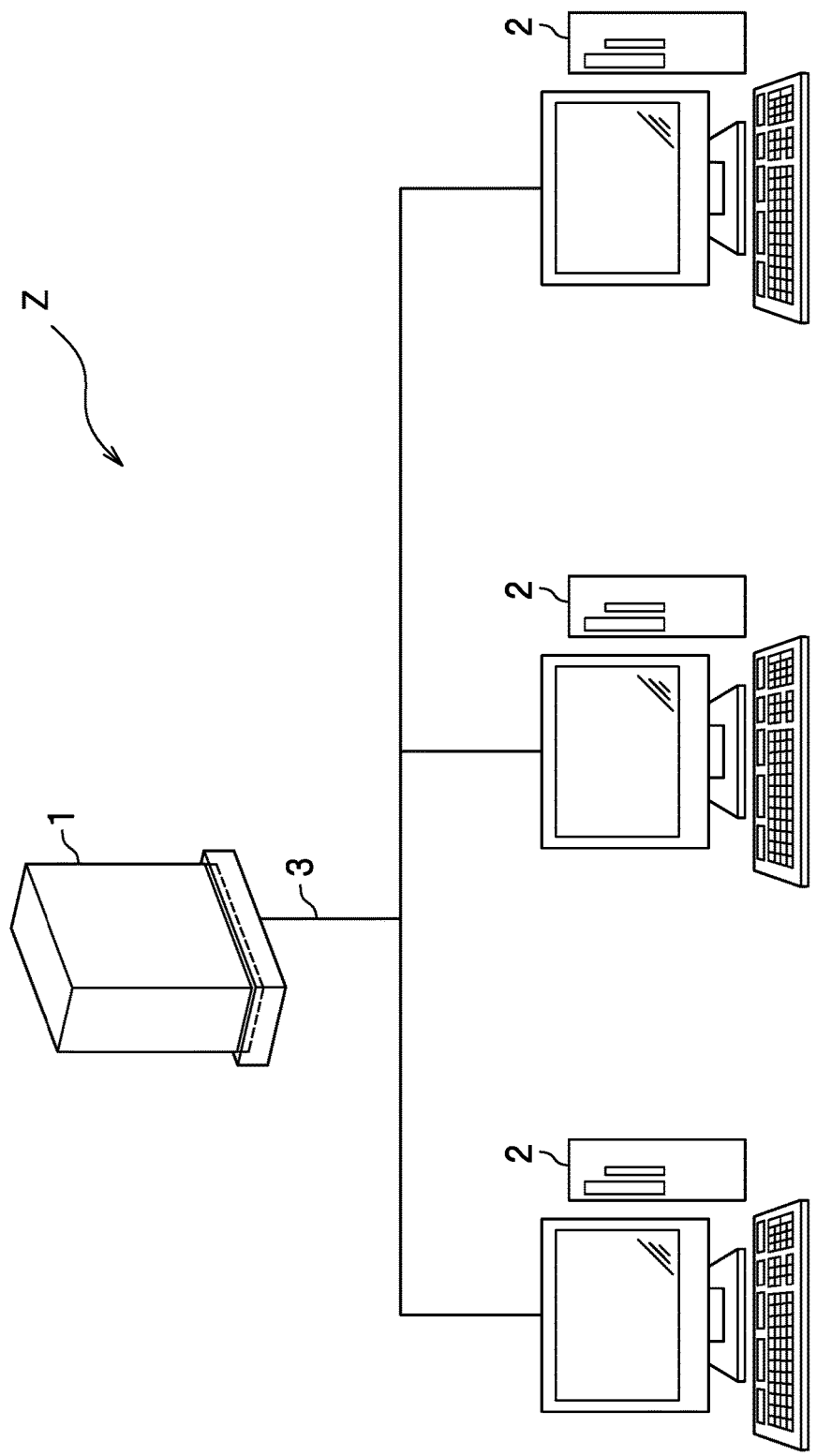
FIG. 1 is a drawing showing a configuration example of an interference check system according to the present embodiment.

An embodiment of the present invention will now be described in detail with reference to drawings as appropriate.
(System Configuration)
FIG. 1 is a diagram showing a configuration example of the interference check system according to the present embodiment.

The interference check system Z comprises at least one server 1 and at least one client terminal 2 which are connected through network such as LAN (Local Area Network) and the like.

The server 1 performs interference check step according to the present embodiment. Further, the client terminal 2 displays a result of interference check step performed on the server 1.

Figure 2:
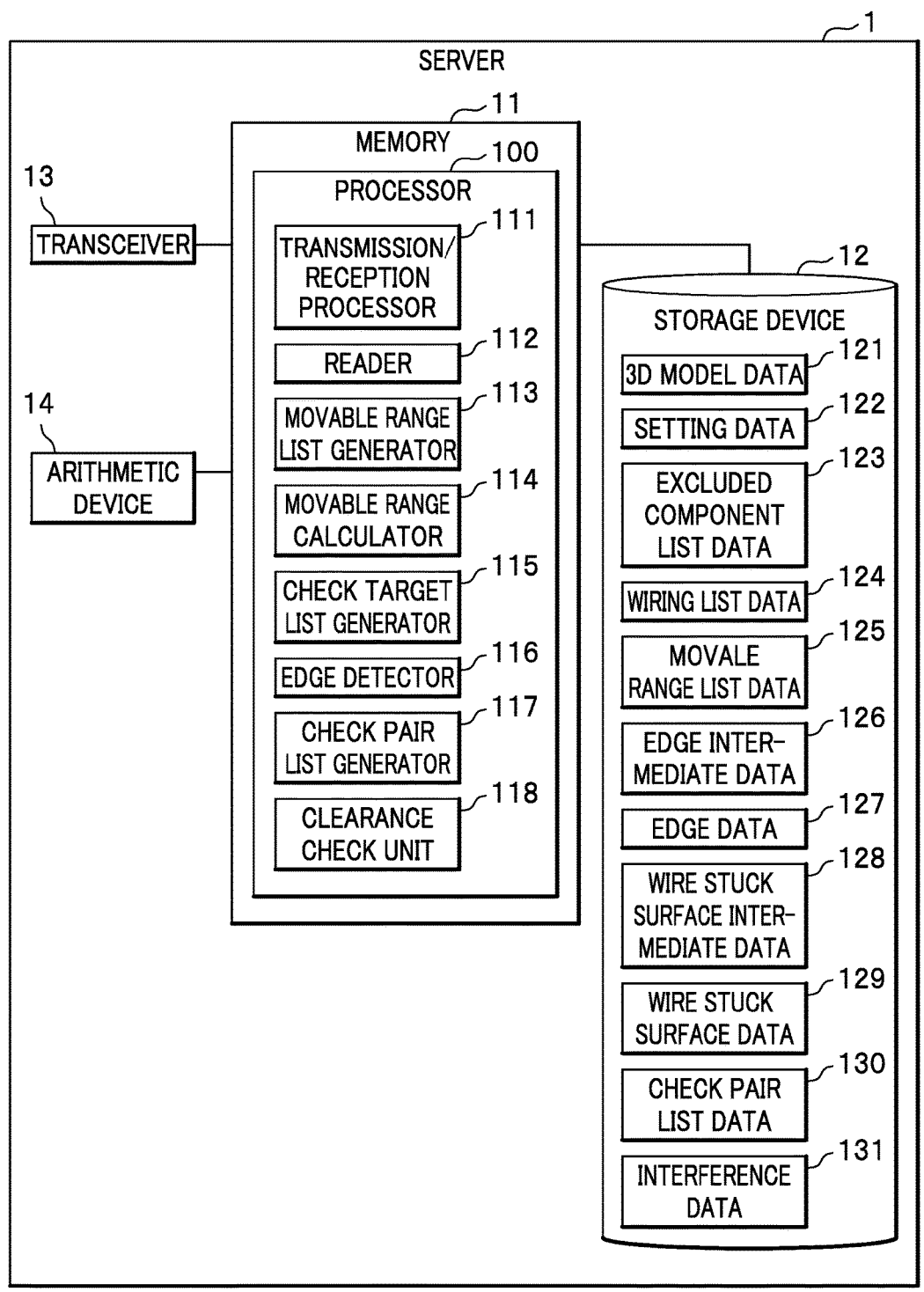
FIG. 2 is a diagram showing a configuration example of a server according to the present embodiment.

(Server)
FIG. 2 is a diagram showing a configuration example of a server according to the present embodiment.

The server 1 includes a memory 11, a storage device 12, a transceiver 13 such as a network interface card and the like, and an arithmetic device such as CPU (Central Step Unit) and the like.

The program stored in the storage device 12 is loaded into the memory 11 and executed by the arithmetic device 14 such that a processor 100, transmission/reception processor 111 operated by the processor 100, a reader 112, a movable range list generator (movable range setting unit) 113, a movable range calculator 114, a check target list generator 115, an edge detector 116, a check pair list generator 117, and a clearance check unit 118 are executed.

The processor 100 controls each of the units 111 to 118.

The transmission/reception processor 111 performs transmitting and receiving information to and from the client terminal 2.

The reader 112 reads necessary data from the storage device 12 and the like.

The movable range list generator 113 generates movable range list data 125 including the information on the movable range of the wiring. The movable range of a wiring will be described later.

The movable range calculator 114 calculates the movable range of the wiring.

The check target list generator 115 generates edge data 127 and wire stuck surface data 129 as check target list data for detecting an edge and a wire stuck surface. The edge and wire stuck surface will be described later.

The edge detector 116 detects the edge.

The check pair list generator 117 generates check pair list data 130 which is a pair list of a wiring model and a check target model (the edge or wire stuck surface) for performing the clearance check.

The clearance check unit 118 uses the check pair list data 130 generated by the check pair list generator 117 to perform the clearance check of determining whether it is possible that the wiring and the check target interfere with each other.

Further, the step performed by each of the units 110 to 118 will be described later.

The storage device 12 such as HD (Hard Disk) and SSD (Solid State Drive) stores three-dimensional model data 121, setting data 122, excluded component list data 123, wiring list data 124, movable range list data 125, edge intermediate data 126, edge data 127, wire stuck surface intermediate data 128, wire stuck surface data 129, check pair list data 130, and interference data 131.

The three-dimensional model data 121 includes three-dimensional shape model (denoted by three-dimensional model hereinafter) of the products (each component, each wiring and the like) generated by three-dimensional CAD and the like. Hereinafter, three-dimensional model of a component is denoted by a component model, while three-dimensional model of a wiring is denoted by a wiring model. Further, an actual wiring and an actual component are described as "a wiring" and "a component" so as to be discriminated from the component model and the wiring model respectively. The wiring model is included in the component model.

The setting data 122 includes the size information or the like on the check rectangular solid described later.

The excluded component list data 123 includes a list of the component models (models for excluded components) which are not subject to the interference check. As examples of the excluded components, there are the wiring, a fastener for fastening the wiring, and the components which are determined not to cause any problem in interfering with the wiring.

The wiring list data 124 includes a list of the wiring models in the three-dimensional model data 121.

The movable range list data 125 includes data on the movable range of each of the wirings.

The edge intermediate data 126, which is output in detecting the edge, includes intermediate data for generating the edge data 127 described later.

The edge data 127 includes information on the edge detected by the check target list generator 115 and the edge detector 116.

The wire stuck surface intermediate data 128, which is output in detecting the wire stuck surface, includes the intermediate data for generating the wire stuck surface data 129 described later.

The wire stuck surface data 129 includes information on the wire stuck surface detected by the check target list generator 115.

The check pair list data 130 includes information on a wiring model and a check target model (an edge or a wire stuck surface) or the like for performing the clearance check.

The interference data 131 includes a result of the interference check step performed by the server 1.

Further, each of data 121 to 131 will now be described later as appropriate. Furthermore, the three-dimensional model data 121, the setting data 122, and the excluded component list data 123 are prepared in advance by the user. Additionally, the wiring list data 124, the movable range list data 125, the edge intermediate data 126, the edge data 127, the wire stuck surface intermediate data 128, the wire stuck surface data 129, the check pair list data 130, and the interference data 131 are generated during the interference check step by the server 1.

(Client Terminal)

Figure 3:
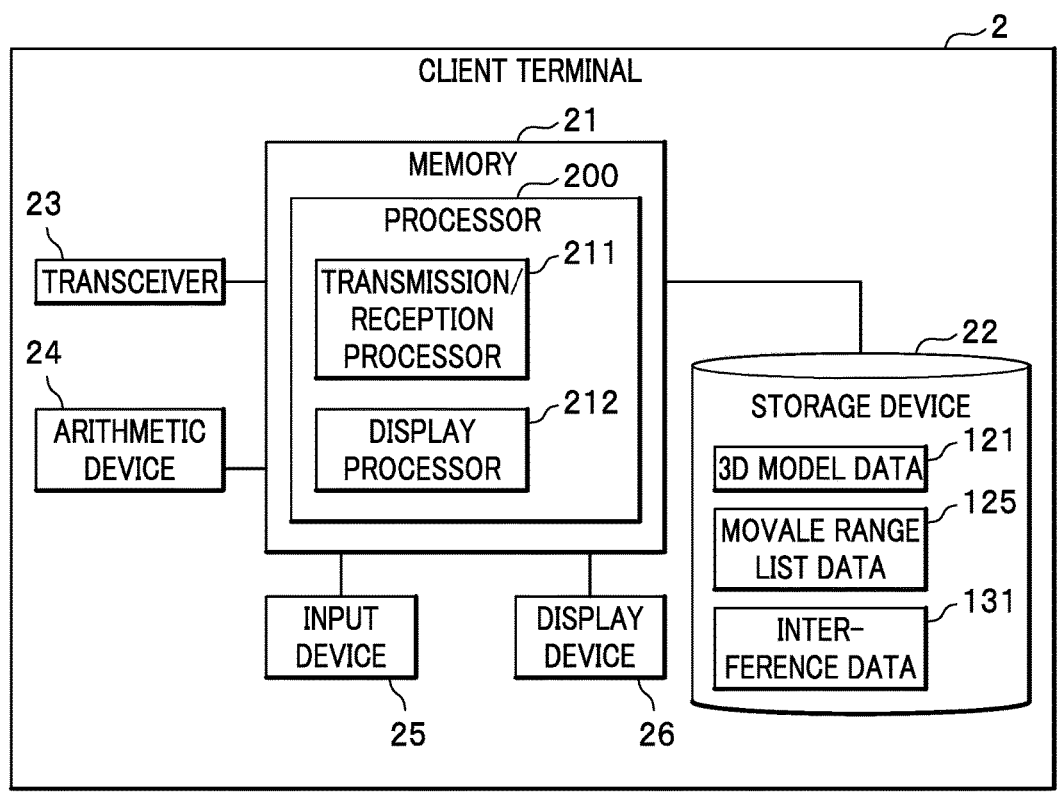
FIG. 3 is a diagram showing a configuration example of a client terminal according to the present embodiment.

FIG. 3 is a diagram showing a configuration example of a client terminal according to the present embodiment.

The client terminal 2 includes a memory 21, a storage device 22, a transceiver 23 such as a network interface card, an arithmetic device 24 such as CPU, an input device 25 such as a keyboard and a mouse, and a display device 26 such as a display.

The program stored in the storage device 2 is loaded into the memory 21 and executed by the arithmetic device 24 such that a processor 200 and a transceiver 211 operated by the processor 200, and a display processor 212 are operated.

The processor 200 controls each of the units in Step 211 and 212.

The transceiver 211 performs transmitting and receiving information to and from the server 1.

The display processor 212 displays on the display device 26 the information on the movable range of the wiring and the interference between the wiring and the component based on the three-dimensional model data 121 obtained from the server 1, the movable range list data 125, and the interference data 131.

The storage device in Step 22 such as a HD and a SSD store the three-dimensional model data 121, the movable range list data 125, and the interference data 131 or the like. Such data are the same as those shown in FIG. 2, thus the description thereof will be omitted here.

In the present embodiment, the interference check system Z may comprise the server 1 and the client terminal 2, however not limited to this, for example, the client server 2 may have a function of the server 1 as well. In other words, the step may be performed by the client terminal 2 of a stand-alone type. Further, the storage device 12 of the server 1 may be a database or the like which is installed outside of the server 1. Furthermore, the functions of the server 1 may be assigned to a plurality of the servers 1.

The following description will refer to FIG. 1 to FIG. 3 as appropriate.

Figure 4:
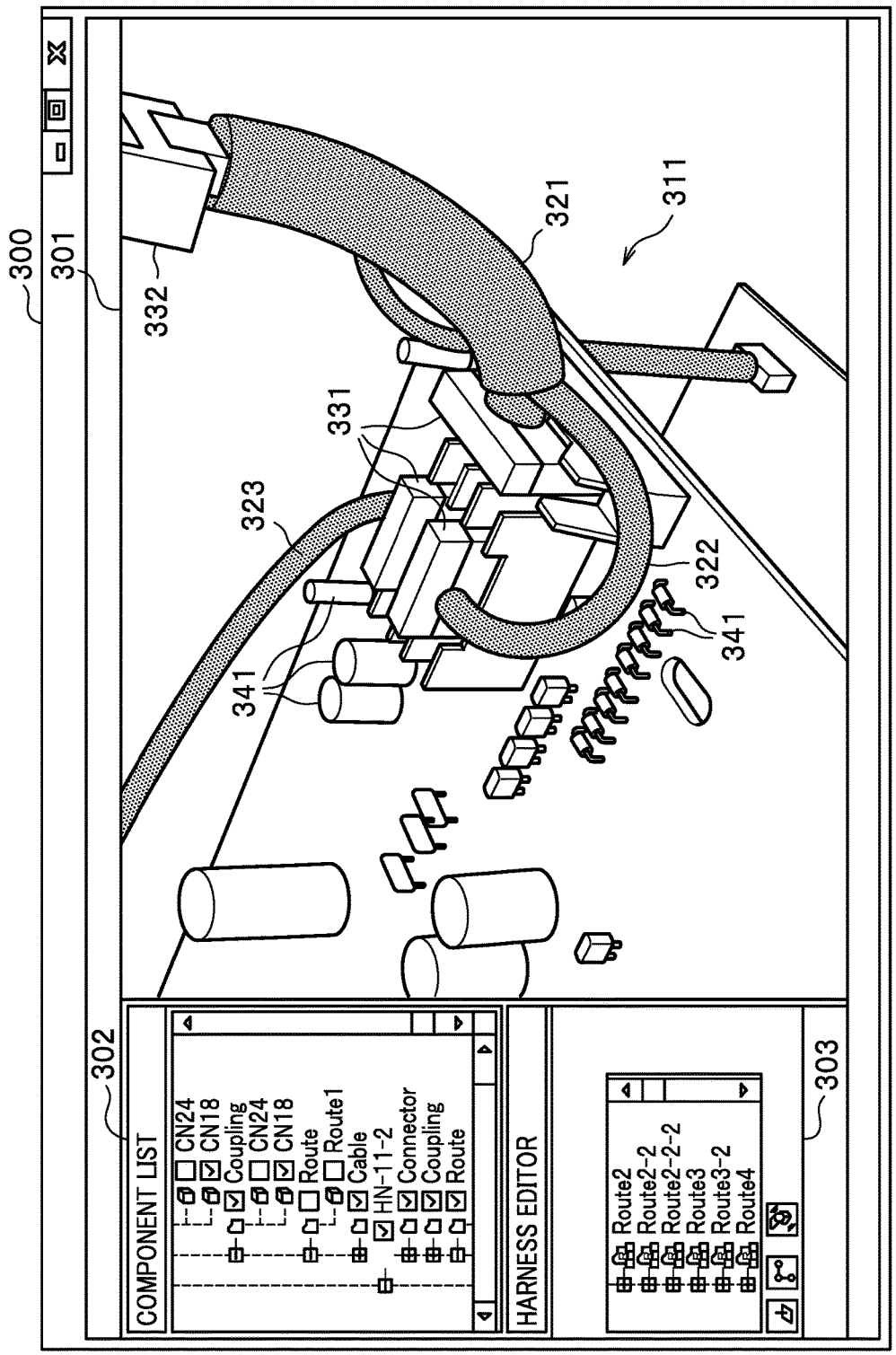
FIG. 4 is a drawing showing an example of a three-dimensional model display screen according to the present embodiment.

FIG. 4 is a drawing showing the example of a three-dimensional model display screen according to the present embodiment.

The three-dimensional model display screen 300 includes a three-dimensional model display unit 301, a layered structure display unit 302, and a wiring editor 303.

The three-dimensional model display unit 301 displays three-dimensional model 311 of a product.

The three-dimensional model 311 displays wiring models 321 to 323, endpoint models 331 and 332, and a component model 341 or the like.

Each of the wiring models 321 to 323, the endpoint models 321 and 332, and the component model 341 are assigned in advance identification numbers, and information on each of the models is identified by the identification numbers. Further, among the identification numbers, ones for the wiring models 321 to 323 are denoted by wiring identification numbers, while one for the component model 341 is denoted by component identification number. Furthermore, the endpoint model 331 and the fastener described later are included in the component.

Each model consists of polygons. Each polygon has as polygon information coordinates of each vertex of a polygon and components of a normal vector of a polygon. Further, each of the models includes information on kinds of components (component kind information: endpoint, fastener or the like) as attribute information in the form of being associated with the identification numbers.

Furthermore, the wiring models 321 to 323 have segment information, information on passing points, information on branching points, information on thickness, and information on kinds of routes besides the polygon information.

Here, a segment is a line as a center line of the wiring model, and the passing points are points on the segment. In other words, the wiring model consists of the segment and the passing points. The information on the kinds of routes includes information as whether a route is a trunk route or a branch route.

Additionally, in the present embodiment, the coordinate indicates a coordinate in the three-dimensional model.

The layered structure display unit 302 displays a layered structure relation of each of the component models and each of the wiring models. The user checks checkboxes of the component models and the wiring models on the layered structure display unit 302 through the input device 25 such that component and wiring models selected are highlighted on the three-dimensional model display unit 301.

Further, the user may perform an editing of the wiring models on the wiring editor 303. The editing of the wiring models mainly includes an addition of the wiring and a change of the route.

(Wiring Model)

Figure 5:
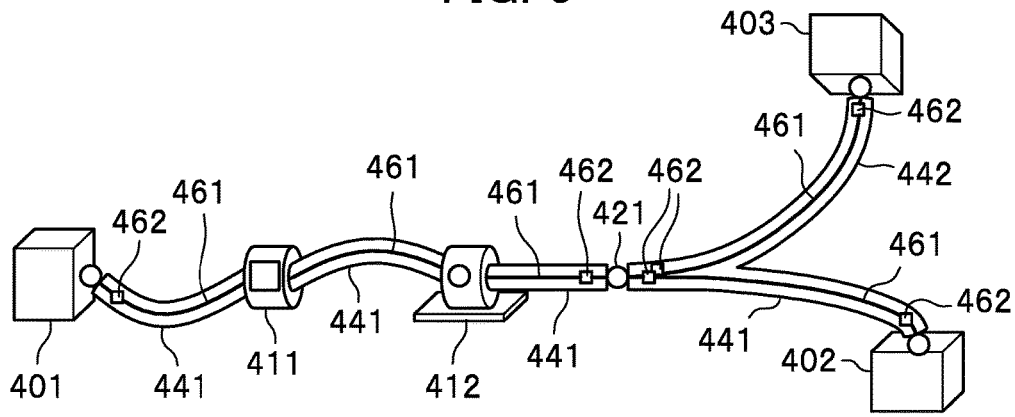
FIG. 5 is a drawing showing an example of a wiring model according to the present embodiment.

FIG. 5 is a drawing showing the example of the wiring model according to the present embodiment.

Signs 401 to 403 indicate endpoint models in FIG. 5. The endpoint models 401 to 403 are shown as endpoint models (signs 331 and 332 in FIG. 4) in the three-dimensional model data 121 (FIG. 2).

Further, signs 411 and 412 indicate fastener models. The fastener models 411 and 412 are set as fixed points together with the endpoint models 401 to 403 in calculating the movable range of the wiring described later.

Furthermore, a sign 421 indicates a branch point.

Additionally, a sign 441 indicates a trunk route model, and a sign 442 indicates a branch route model. In the initial state, the trunk route model 441 and the branch route model 442 are not discriminated to be included in the three-dimensional model data 121 as one wiring model. The discrimination between the trunk route model 441 and the branch route model 442 is made in Step 205 in FIG. 7 described later.

Further, a sign 461 indicates a segment of the wiring model, and a sign 462 indicates the passing point.

Furthermore, the fixed points are points such as the endpoint and the fastener not to cause the wiring move.

(Whole Step)

Figure 6:
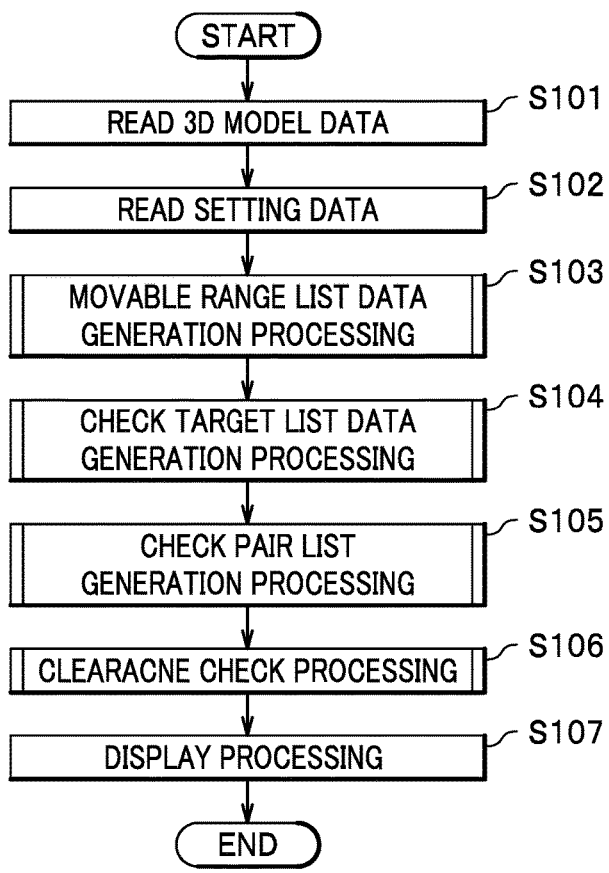
FIG. 6 is a flowchart indicating a procedure of a whole step according to the present embodiment.

FIG. 6 is a flowchart indicating the procedure of the whole step according to the present embodiment.

Firstly, the three-dimensional model data 121 is read by the reader 112 from the storage device 12.

Then, the setting data 122 is read by the reader 112 (Step 101).

Next, the movable range list generator 113 performs the movable range list data generation step of generating the movable range list data 125 based on the data read in each step in Step 101 and Step 102 (Step 103). The movable range list data generation step will be described in detail later.

Subsequently, the check target list generator 115 and the edge detector 116 perform the check target list data generation step of generating the check target list data such as the edge data 127 and the wire stuck surface data 129 based mainly on the three-dimensional model data 121 read in Step 101 (Step 104). The details of the check target list data generation step will be described later. Further, the check targets are the edge and the wire stuck surface or the like which are subject to checking of interference with the wiring as described in detail later.

Furthermore, the check pair list generator 117 performs the check pair list data generation step of generating the check pair list data 130 which is all combinations of the wiring model and the check target model (Step 105). The check pair list data generation step will be described in detail later.

Next, the clearance check unit 118 performs clearance checking step of checking each clearance using the check pair list data 130 generated in Step 105 (Step 106). The clearance checking step will be described in detail later.

Further, the client terminal 2 obtains the three-dimensional model data 121 and the movable range list data 125, and the interference data 131 from the server 1. Subsequently, the display processor 212 performs display step (Step 107) of displaying the step result of Step 106 on the display device 26, so that the step is finished by the processors 100 and 200.

(Movable Range List Data Generation Step: S103)

Figure 7:
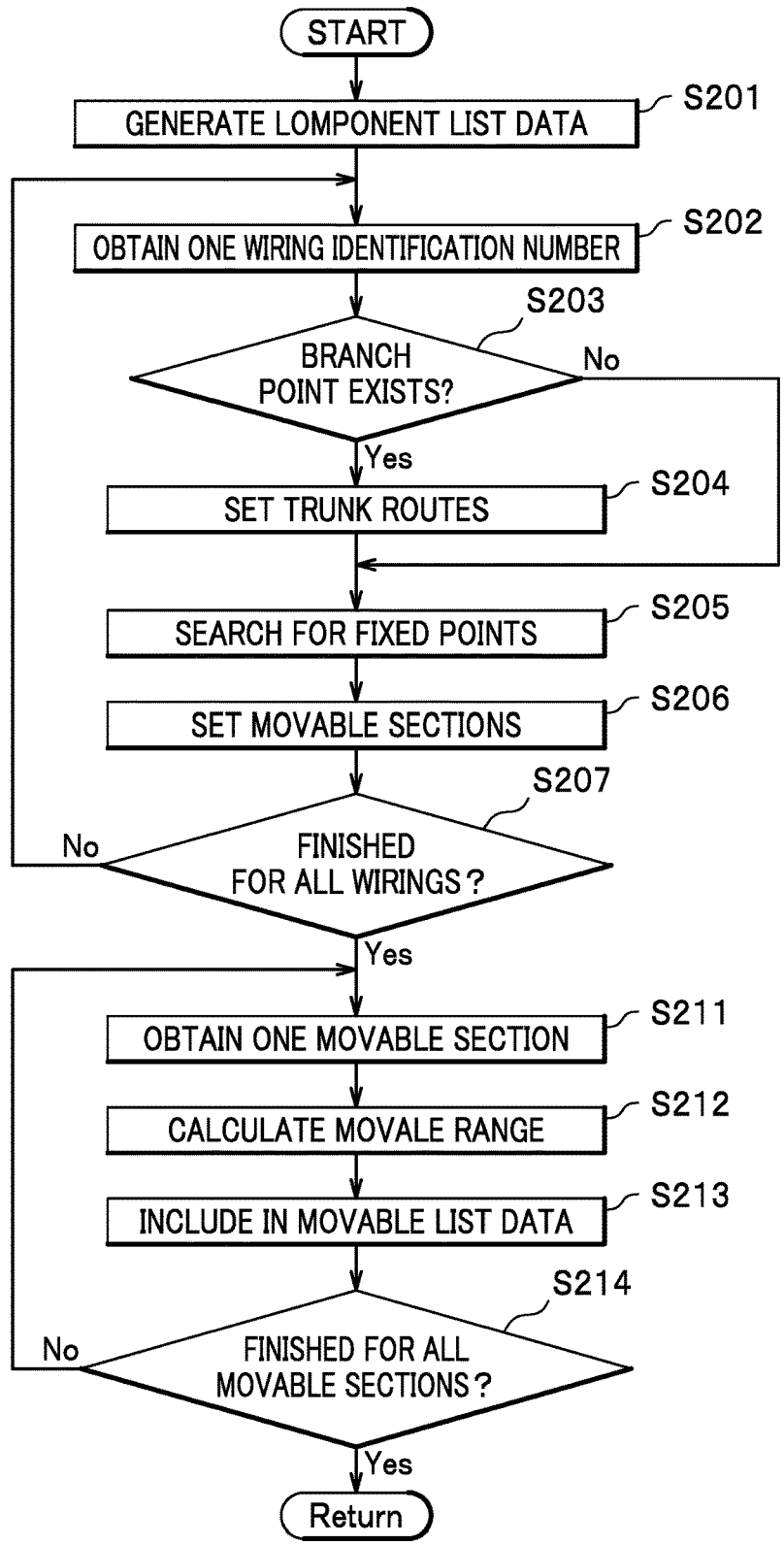
FIG. 7 is a flowchart indicating a procedure of movable range list data generation step according to the present embodiment.

FIG. 7 is a flowchart indicating the procedure of the movable range list data generation step according to the present embodiment. Further, the movable range list data generation step as shown in FIG. 7 corresponds to Step 103 in FIG. 6.

Firstly, the movable range list generator 113 generates the wiring list data 124 based on the three-dimensional model data 121 read in Step 101 in FIG. 6 (Step 201).

In other words, the movable range list generator 113 searches for the information on a component kind of each model and specifies the three-dimensional model (wiring model) whose component kind is "wiring" Then, the movable range list generator 113 includes the identification number (wiring identification number) accompanying the specified wiring mode in the wiring list data 124.

Thereby, the wiring list data 124 which is a list of identification numbers of the wiring models (wiring identification numbers) is generated.

Next, the movable range list generator 113 obtains one wiring identification number from the wiring list data 124 (Step 202).

Then, the movable range list generator 113 determines whether there is the branch point in the wiring model indicated by the obtained wiring identification number (Step 203). Such step is performed in such a way that the movable range list generator 113 searches information on the branch point accompanying the wiring model as attribute information.

If there is no branch point (Step 203→No) as a result of Step 203, the movable range list generator 113 advances to Step 205.

If there is a branch point (Step 203→Yes) as a result of Step 203, the movable range list generator 113 sets the trunk route (Step 204) in the wiring model to advance to Step 205. The setting of the trunk route is performed mainly in such a way that the user designates the trunk route through the input device 25.

Further, the movable range list generator 113 searches for fixed points set in the wiring model to be processed with reference to the wiring model (Step 205). "Searching for the fixed points" is, in other words, intended to search the endpoint model and the fastener model and the like. Specifically, in the searching step of the fixed points, the movable range list generator 113 determines whether any of the following information is provided as the attribute information on the wiring model.

(a1) the passing point at which the fixed point is set explicitly (a2) the endpoint (example: connector or the like) at which the fixed point is set explicitly (a3) the branch point in the case where the wiring model to be processed is not a trunk line (in case of the branch route)

(a4) the passing point passing the fastener or a point of the segment closest to the center of the fastener In an example of the wiring model shown in FIG. 5, the endpoint models 401 to 403 and the fastener models 411 and 412 are fixed points.

Further, a branch point 421 is not the fixed point in the trunk route mode 441, while in the branch route model 442 the branch point 421 is the fixed point.

The movable range list generator 113 searches all of the passing points on the wiring model to be processed for the fixed point.

FIG. 7 will be described again.

Next, the movable range list generator 113 sets from one fixed point to the other fixed point in the wiring model to be processed as a movable section (Step 206).

Further, the movable range list generator 113 determines whether the steps in Step 202 to Step 206 are finished for all of the wiring models (Step 207).

If the steps are not finished for all of the wiring models (Step 207→No) as a result of Step 207, the movable range list generator 113 returns to Step 202.

After the steps are finished for all of the wiring models (Step 207→Yes) as a result of Step 207, the movable range list generator 113 obtains one movable section set (Step 211).

Next, the movable range list generator 113 calculates the movable range in the obtained movable section (Step 212).

Here, Step 212 will be described with reference to FIG. 8. FIG. 8 shows the calculation method of the movable range of the wiring according to the present embodiment.

Specifically, as shown in FIG. 8, when the fixed point is set as the focal point ($F_1$, $F_2$), a rotation ellipsoid body defined by a expression $|PF_1|+|PF_2|=S$ is the movable range of the wiring (A two dimensional ellipse is shown in FIG. 8, however in reality, a three-dimensional rotation ellipsoid body obtained by rotating the two-dimensional ellipse is the movable range of the wiring).

Here, P is any point on the generated rotation ellipsoid body, and S is a length of the wiring (a length of the segment) in the movable section.

FIG. 7 will be described again.

Furthermore, the movable range list generator 113 includes information on an interior region of the calculated rotation ellipsoid body as the movable range in the movable range list data 125 (Step 213). The movable range may be the coordinates of the fixed points (i.e. focal points ($F_1$, $F_2$)) and the expression of the calculated rotation ellipsoid body or the like.

FIG. 9 shows an example of the movable range of the wiring according to the present embodiment. Further, the same elements in FIG. 9 as the ones in FIG. 5 are assigned the same signs as the ones used in FIG. 5, thereby FIG. 9 will be not be described.

A rotation ellipsoid body 451 shows a movable range of the trunk route model 441 in which the endpoint model 401 and the fastener model 411 are fixed points. In this case, a section between the endpoint model 401 and the fastener model 411 is the movable section.

Similarly, a rotation ellipsoid body 452 shows a movable range of the trunk route model 441 in which the fastener model 411 and the fastener model 412 are fixed points. In this case, a section between the fastener model 411 and the fastener model 412 is the movable section.

Further, a rotation ellipsoid body 453 shows a movable range of the trunk route model 441 in which the fastener model 412 and the endpoint model 402 are fixed points. In this case, a section between the fastener model 412 and the endpoint model 402 is the movable range.

Furthermore, a rotation ellipsoid body 454 shows a movable range of the branch route model 442 in which the branch point 421 and the endpoint model 403 are fixed points. In this case, a section between the branch point 421 and the endpoint model 403 is the movable section.

As described above, the branch point 421 is not regarded as a fixed point in the trunk route model 442, while it is regarded as a fixed point in the branch route model 442.

FIG. 10 shows an example of the movable range list data according to the present embodiment.

As shown in FIG. 10, the movable range list data 125 includes the wiring identification number, the first fixed point coordinate, the second fixed point coordinate, and the wiring length.

The first fixed point coordinate and the second fixed point coordinate are coordinates of two fixed points which are focal points of a rotation ellipsoid body. Such coordinates are in the three-dimensional model data 121, and the movable range list data generator 113 obtains the coordinates of the fixed points in the wiring model from the three-dimensional model data 121 to include them in the movable range list data 125.

The wiring length is a length between the first fixed point and the second fixed point. The wiring length is calculated in such a way that the segment lengths between the corresponding fixed points in the wiring model are summed up by the movable range list generator 113 to be included in the movable range list data 125.

FIG. 7 will be described again.

Subsequently, the movable range list generator 113 determines whether the steps in Step 211 to Step 213 are finished for all of the movable sections (Step 214).

If the steps are not finished (Step 214→No) as a result of Step 214, the movable range list generator 113 returns to Step 207.

After the steps are finished (Step 214→Yes) as a result of Step 214, the processor 100 returns to S104.

(Check Target List Data Generation Steps 104)

Figure 11:
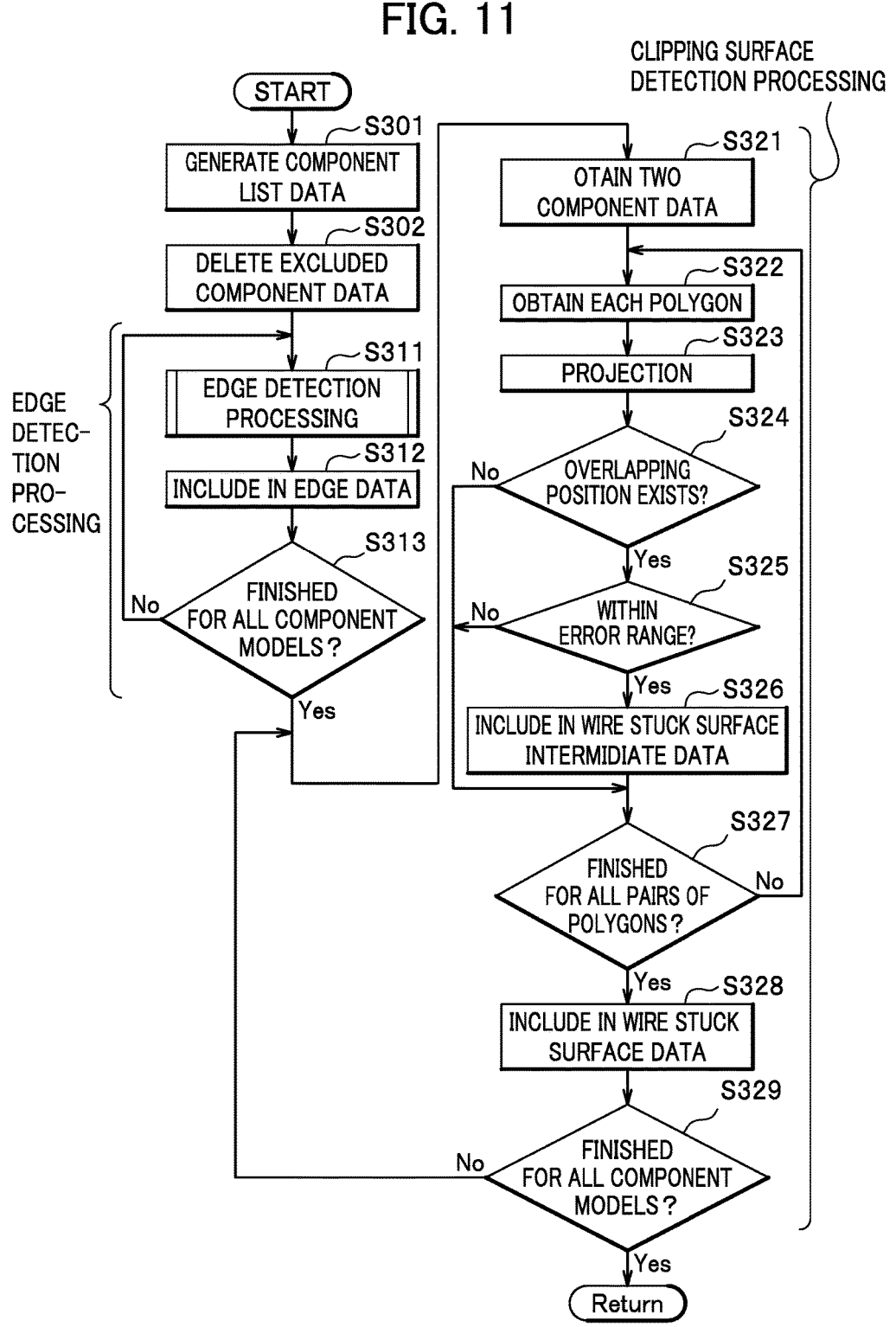
FIG. 11 is a flowchart indicating a procedure of check target list data generation step according to the present embodiment.

FIG. 11 is a flowchart indicating the procedure of the check target list data list data generation step according to the present embodiment.

Further, the check target list data list data generation step shown in FIG. 11 corresponds to the step of S104 in FIG. 6. The edge data 127 and the wire stuck surface data 129 are generated in the check target list data generation step.

Firstly, the check target list generator 115 generates the component list data based on the three-dimensional model data 121 (Step 301). Here, the component list data have the component identification numbers included in a list format.

Next, the check target list generator 115 refers to excluded component list data 123 prepared in advance to delete data of the component (component to be excluded) included in the excluded component list data 123 from the component list data (Step 302). Thereby, the following step can be performed efficiently.

In Step 302, the check target list generator 115, for example, searches a component model associated with the component identification number in the component list data to search the three-dimensional model data 121 for component kind information which is one of the attribute information on the component model. Further, the check target list generator 115, when the component kind information on the component model to be processed is included in the excluded component list data 123, excludes the component identification number of the component model to be processed from the component list data.

Thereafter, the check target list generator 115 and the edge detector 116 perform Step 311 to Step 313 so as to detect the edge.

Figure 12:
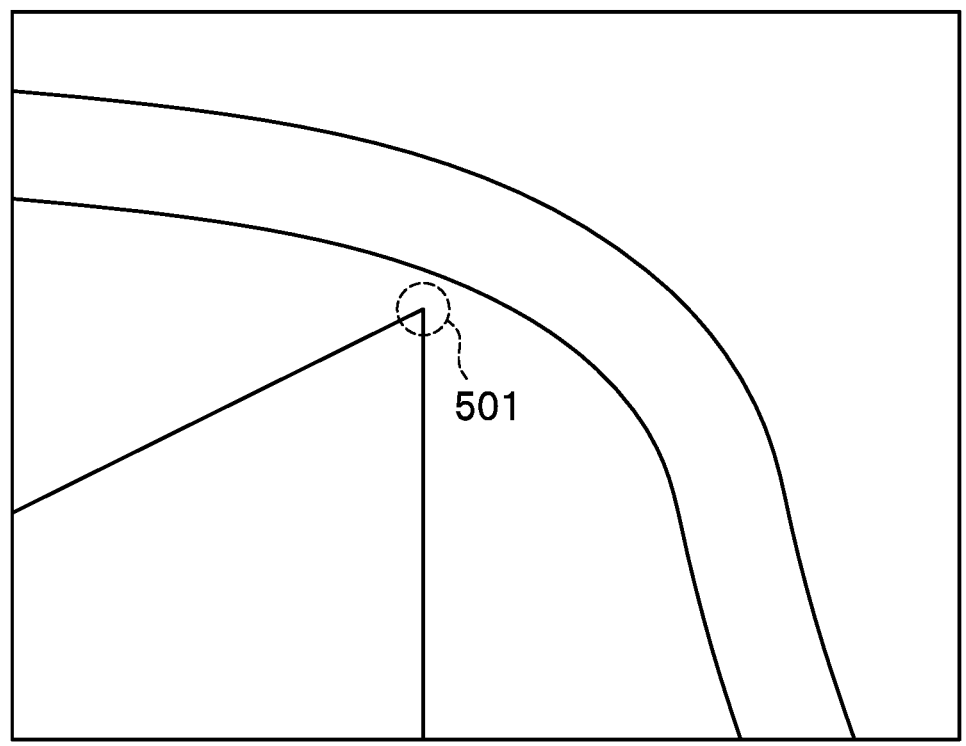
FIG. 12 is a drawing showing an example of an edge.

Here, FIG. 12 shows an example of the edge.

The edge is a section which makes an acute angle in the component and could damage the wiring as indicated by sign 501 in FIG. 12.

FIG. 11 will be described again.

Next, the edge detector 116 performs an edge detection step (Step 311).

(Edge Detection Step: Step 311)

Figure 13:
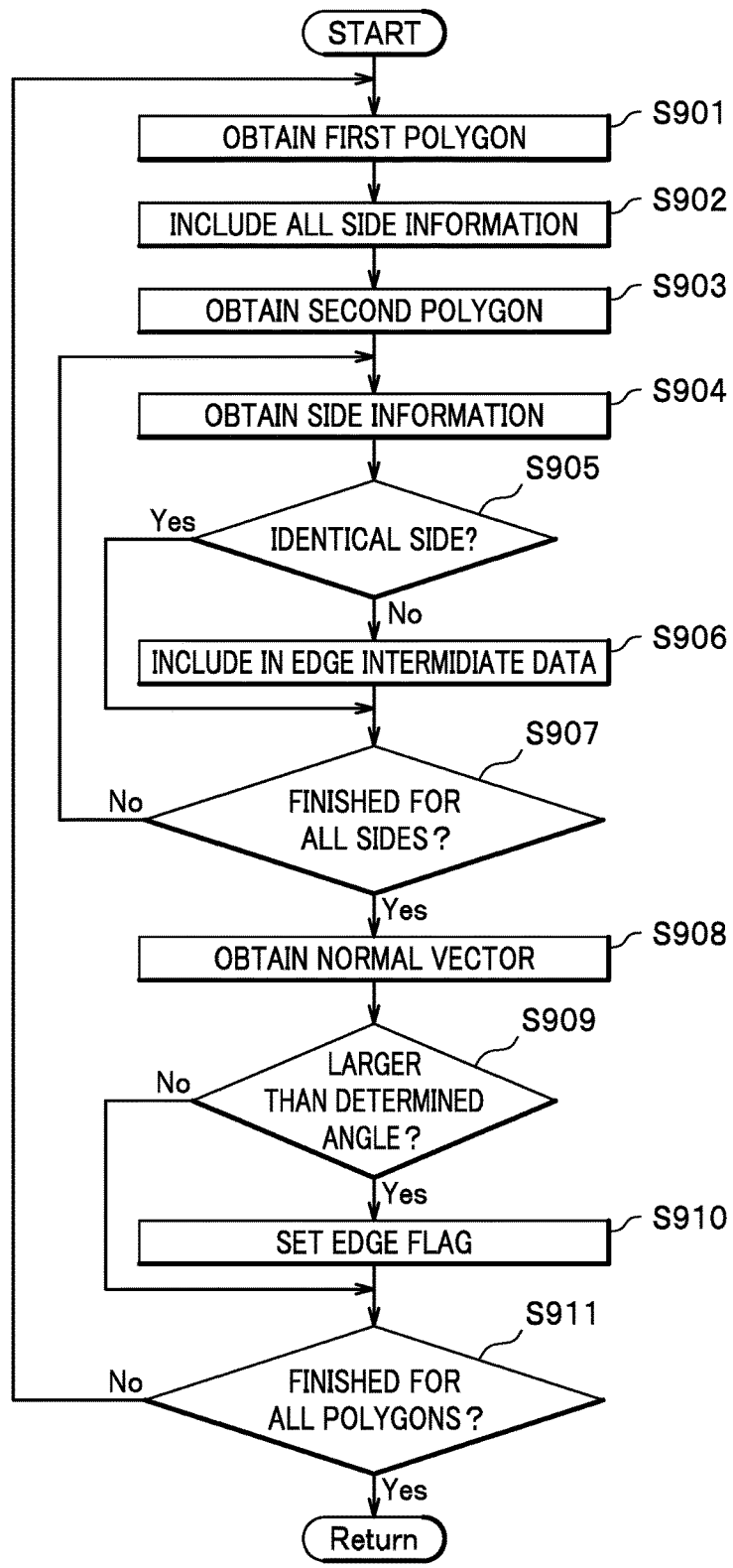
FIG. 13 is a flowchart indicating the procedure of edge detection step according to the present embodiment.

FIG. 13 is a flowchart showing the procedure of the edge detection step according to the present embodiment.

Firstly, the edge detector 116 selects a record (component identification number) from the component list data to obtain a polygon (hereinafter, denoted by the first polygon) in the component model (Step 901).

Next, the edge detector 116 includes the side information on all of the sides in the first polygon in the edge intermediate data 126 (Step 902).

Figure 14A:
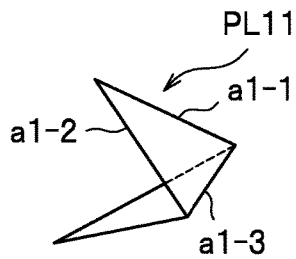
FIG. 14A is a drawing showing information on the first polygon.

The result of the step of Step 902 will now be described with reference to FIG. 14A. FIG. 14A is a drawing showing information on the first polygon.

The edge detector 116 includes in the side information on the edge intermediate data 126 three sides a1-1 to 1-3 in the first polygon PL11 as side information together with the component identification number of the component model to be processed and the polygon information to be processed. Further in the present embodiment, as shown in FIG. 14 the polygon information is represented conveniently as "PL11", "PL12" and the like, however in reality, the polygon information includes coordinates of each vertex of a polygon and components of a normal vector of the polygon.

FIG. 13 will now be described again. The edge detector 116 obtains a polygon (the second polygon) adjacent to the first polygon in the component model obtained in Step 901 (Step 903). Here, the adjacent polygon means a polygon having a identical side or a identical vertex.

Next, the edge detector 116 obtains information on one of sides in the obtained second polygon (Step 904).

Further, the edge detector 116 determines whether a side of the obtained second polygon is identical to a side of the first polygon (Step 905).

If the former side is identical to the latter side (Step 905→Yes) as a result of Step 905, the edge detector 116 advances to Step 907.

If the former side is not identical to the latter side (Step 905→No) as a result of Step 905, the edge detector 116 includes the information on the side (side information) of the second polygon to be processed in the edge intermediate data 126 (Step 906).

Figure 14B:
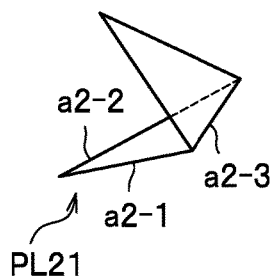
FIG. 14B is a drawing showing information on the first and the second polygons.

The steps in Step 903 to Step 906 will now be described with reference to FIG. 14B. FIG. 14B is a drawing showing the information on the first polygon and the second polygon.

The edge detector 116 includes in the edge intermediate data 126 the information on sides a2-1 and a2-2 of the second polygon PL21 as the side information. However, since a side a2-3 is identical to a side a1-3 of the first polygon PL11 as shown in 14A, the edge detector doesn't include the information on the side a2-3 in the edge intermediate data 126.

FIG. 13 will now be described again. If determined as "Yes" in Step 905 or after Step 906, the edge detector 116 determines whether the steps in Step 904 to Step 906 are finished for all of the sides of the second polygon (Step 907).

If the steps are not finished (Step 907→No) as a result of Step 907, the edge detector 116 returns to Step 904.

Figure 14C:
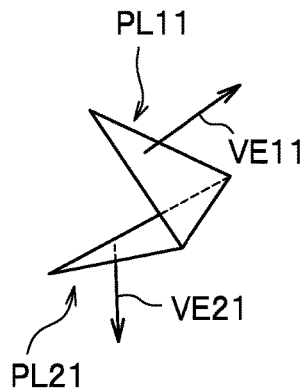
FIG. 14C is a drawing showing information on an edge.

If the step is finished (Step 907→Yes) as a result of Step 907, the edge detector 116 obtains a normal vector VE11 of a surface made by the first polygon PL11 and a normal vector VE21 of a surface made by the second polygon PL21 as shown in FIG. 14C (Step 908). The polygons are identified by the information on the coordinates of each vertex in a three-dimensional model and the components of a normal vector of a polygon so that in Step 908 the edge detector 116 is only required to obtain the components of the normal vector of the polygon to be processed.

Further, the edge detector 116 determines whether an angle in FIG. 14C made by the normal vectors VE11 and VE21 is larger than a predetermined angle (Step 909). Here, the predetermined angle is such an angle that there is a risk that an edge of the angle could damage the wiring. The angle is, for example, 90 degrees.

If the angle is the predetermined angle or smaller (Step 909→No) as a result of Step 909, the edge detector 116 advances to Step 911.

If the angle is larger than the predetermined angle (Step 909→No) as a result of Step 909, the edge detector 116 sets an edge flag in the edge intermediate data 126 (Step 910).

The step of Step 910 will now be described with reference to FIG. 14C. FIG. 14C is a drawing showing information on the edge.

As shown in the table on the right of FIG. 14C, the angle made by the normal vectors VE11 and VE12 is larger than the predetermined angle, an edge flag is set for the identical side a1-3 shared by the first polygon PL11 and the second polygon PL21 in the edge intermediate data 126. The identical side a1-3 shared by the first polygon PL11 and the second polygon PL21 is, in other words, the edge itself.

FIG. 13 will be described again.

If the angle is the predetermined angle or smaller (Step 909→No) in Step 909 or after Step 910, the edge detector 116 determines whether the steps from Step 901 to Step 910 are finished for all pairs of the polygons (Step 911).

If the steps from Step 901 to Step 910 are not finished (Step 911→No) as a result of Step 911, the edge detector 116 returns to Step 901.

After the steps from Step 901 to Step 910 are finished (Step 911→Yes) as a result of Step 911, the processor 100 returns to Step 312 in FIG. 11.

FIG. 11 will be described again.

The check target list generator 115 includes the contents of the edge intermediate data 126 in the edge data 127 (Step 312) after Step 311 to determine whether the steps from Step 311 to Step 312 are finished for all component models (Step 313).

If the steps from Step 901 to Step 910 are not finished (Step 313→No) for all of the component models as a result of Step 313, the check target list generator 115 returns to Step 311.

After the steps from Step 901 to Step 910 are finished (Step 313→Yes) for all component models as a result of Step 313, the check target list generator 115 advances to Step 321.

Figures 15, 16:
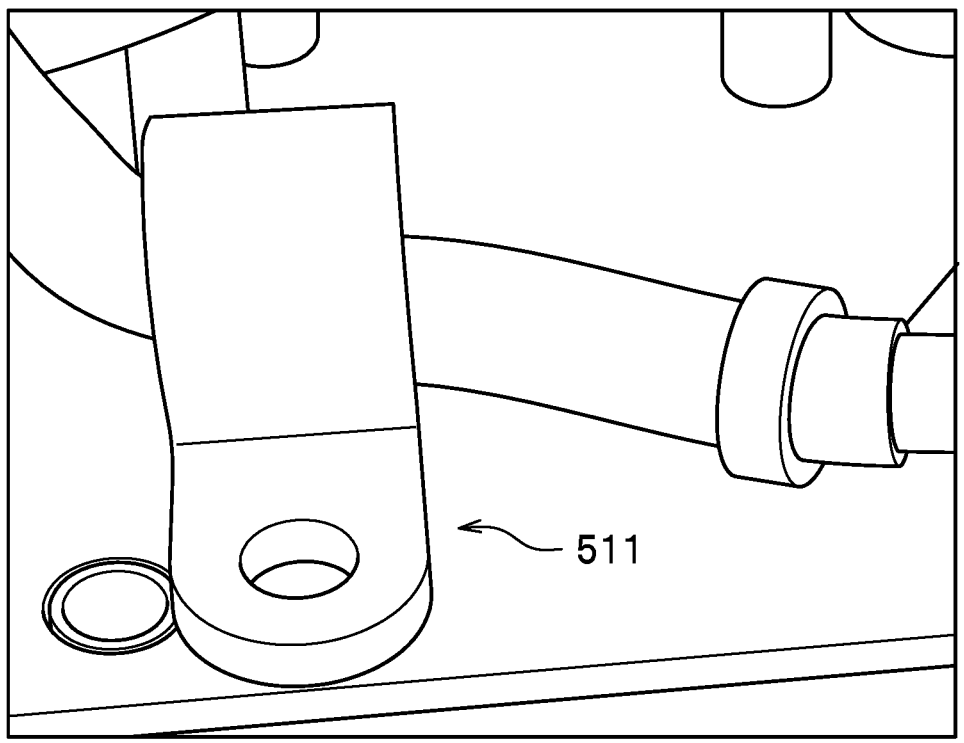
FIG. 15 is a table showing an example of edge data according to the present embodiment.
FIG. 16 is a drawing showing an example of a wire stuck surface.

FIG. 15 is a table showing an example of the edge data according to the present embodiment.

The edge data 127 has an edge identification number, a component identification number, and edge information.

The edge identification number is a number assigned by the check target list generator 115 and a number to identify each edge. Further, if an edge is associated with the same component model as another edge is associated, and the edge and the other edge are continuous between the polygons, the same edge identification number is assigned to both of the edges.

The component identification number for a target component model is included in the component identification number.

Further, polygon information in which edge is detected and side information are included in the edge information. Here, the polygon information and side information to be included are polygon and side information for which the edge flag has been set in the edge intermediate data 126 as shown in FIG. 14C.

FIG. 11 will be described again.

Next, the check target list generator 115 performs the steps in Step 321 to Step 328 to detect a wire stuck surface.

Here, FIG. 16 is a drawing showing an example of a wire stuck surface.

A wire stuck surface is a section at which surfaces of two components are joined in such a way that the surfaces face (oppose) each other as indicated by a sign 511 in FIG. 16, for example, a packing between components and a surface between which a wiring could get stuck when joining is performed. Further, the surfaces contact with each other in FIG. 16.

The step in FIG. 11 will be described again.

Firstly, the check target list generator 115 obtains two records (component data) from the component list data (Step 321).

Next, the check target list generator 115 obtains one polygon respectively from each of the component models in the two records obtained (Step 322).

At that time, the check target list generator 115 may determine whether the obtained polygons are surfaces facing each other. In other words, the check target list generator 115 may determine whether the two polygons obtained are the surfaces facing each other in the component from which the polygons are obtained by referring to the three-dimensional model data 121. Further, when the obtained polygons constitute the surfaces facing each other, the check target list generator 115 may also perform the step after Step 323.

Next, the check target list generator 115 sets one polygon among the two polygons obtained as a xy plane and projects the other polygon on the xy plane (Step 323).

Further, the check target list generator 115 determines whether there is an overlapping section (duplicate section) on the two polygons as a result of the projection (Step 324).

If there is not an overlapping section (Step 324→No) as a result of Step 324, the check target list generator 115 advances to Step 327.

If there is an overlapping section (Step 324→Yes) as a result of Step 324, the check target list generator 115 refers to the three-dimensional model data 121 for the polygon to be processed. Further, the check target list generator 115 determines whether there is a section at which the distance between the overlapping polygons is within an error range (Step 325). The error range is, for example, $10^{-2}$ mm.

Figure 17C:
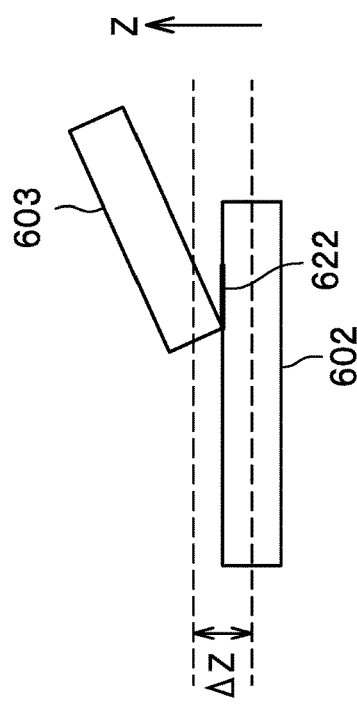
FIG. 17C is a top view showing one of polygons inclined relatively to the other polygon and in contact with each other.

The steps from Step 323 to Step 325 will be described with reference to FIG. 17. FIG. 17 shows a procedure of a wire stuck surface detection step according to the present embodiment. FIG. 17A is a top view showing tow polygons disposed in parallel with each other and in contact with each other, and FIG. 17B is a side view showing two polygons disposed in parallel with each other and in contact with each other, while FIG. 17C is a top view showing one of polygons inclined relatively to the other polygon and in contact with each other, and FIG. 17C is a side view showing one of two polygons inclined relatively to the other polygon while contacting with each other.

Further, the steps from Step 323 to Step 325 are performed for polygons, and FIG. 17 will be described assuming polygons are rectangular solids to be easily viewable.

Figure 17D:
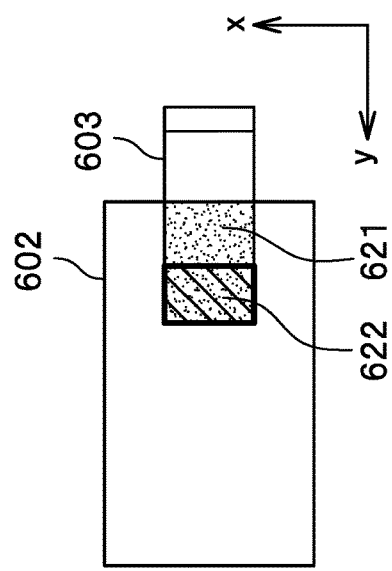
Figure 17A:
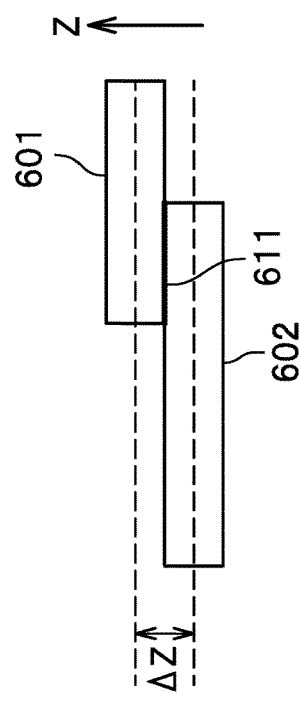
FIG. 17A is a top view showing tow polygons disposed in parallel with each other and in contact with each other.
Figure 17B:
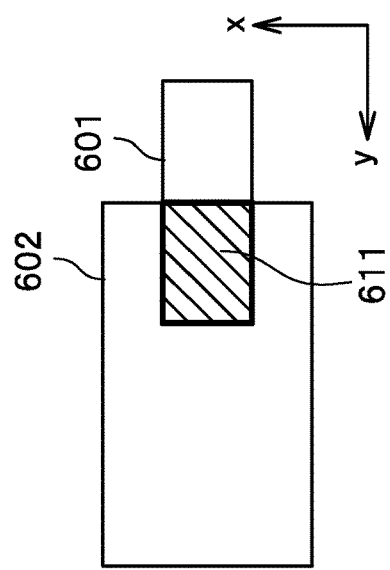

Firstly, when a polygon 601 and a polygon 602 seen from a lateral direction are configured to be related as shown in FIG. 17A, with the height directions of the polygons 601 and 602 being a z direction, for example, when an upper surface of the polygon 602 is set as a xy plane, FIG. 17B is a result of projecting the polygon 601 on the xy plane.

Here, a section at which the projected polygons 601 and 602 overlap with each other is a surface 611 in FIG. 17A and FIG. 17B. As shown in FIG. 17A, the distance between the polygon 601 and the polygon 602 for the entire surface of the surface 611 is within an error range $\Delta z$.

In such a case, the check target list generator 115 determines the entire surface of the surface 611 as the wire stuck surface. This is because, if the distance between the polygon 601 and the polygon 602 is within the error range $\Delta z$, there is a risk that failures such that the stuck wiring is damaged and cut could occur.

Further, when the polygon 603 and the polygon 602 seen from a lateral direction are configured to be related as shown in FIG. 17C, with the height directions of the polygons 603 and 602 being a z direction, for example, when an upper surface of the polygon 602 is set as a xy plane, FIG. 17D is a result of projecting the polygon 603 on the xy plane.

Here, a section on which the projected polygon 603 and the polygon 602 overlap with each other is a surface 621 (section indicated with dots) as shown in FIG. 17D. As shown in FIG. 17C, a section on which the distance between the polygon 603 and the polygon 602 is within an error range $\Delta z$ is a surface 622 (section indicated by oblique lines in FIG. 17D)

In such a case, the check target list generator 115 determines that sticking can be caused on the surface 622.

FIG. 11 will be described again.

If there is not a section within an error range (Step 325→No) as a result of Step 325, the check target list generator 115 advances to Step 327.

If there is a section within an error range (Step 325→Yes) as a result of Step 325, the check target list generator 115 includes the information on the wire stuck surface to be processed (the wire stuck surface information) in the wire stuck surface intermediate data 128 (Step 326).

Figures 18, 19, 20:
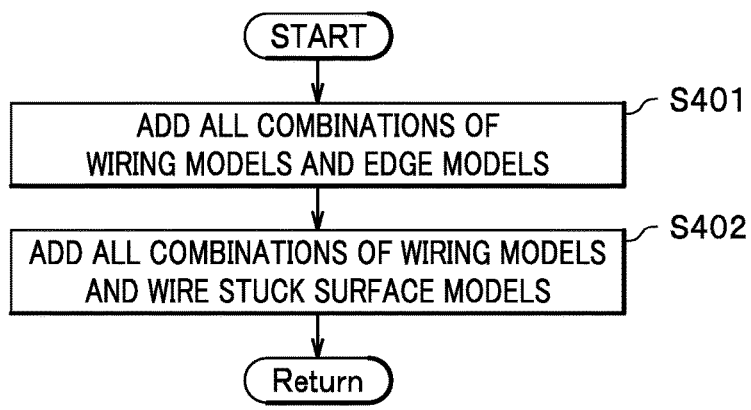
FIG. 18 is a table showing an example of wire stuck surface intermediate data according to the present embodiment.
FIG. 19 is a table showing an example wire stuck surface data according to the present embodiment.
FIG. 20 is a flowchart showing a procedure of check pair list data generation step according to the present embodiment.

FIG. 18 is a table showing the example of wire stuck surface intermediate data according to the present embodiment.

The wire stuck surface intermediate data 128 has the first component identification number, the first polygon information, the second component identification number, and the second polygon information.

The first and the second component identification numbers are two component identification numbers in the record obtained in Step 321.

The first and second polygon information is polygon information to be processed in Step 322 to Step 325.

Further, here even when polygons only overlap partially with each other as shown in FIG. 17, the entire surface of each of the polygons is regarded as a wire stuck surface. In such a case where polygons only overlap partially with each other as above, the check target list generator 115 may include the coordinates for a range of overlapping in the wire stuck surface intermediate data 128.

FIG. 11 will be described again.

Subsequently, the check target list generator 115 determines whether the steps from Step 322 to Step 326 are finished for all pairs of the polygons in the two component models to be processed (Step 327). Further, in Step 327 the check target list generator 115 may determine whether the steps from Step 322 to Step 326 are finished only for the pair of adjacent polygons.

If the steps are not finished for the pairs of all polygons (Step 327→No) as a result of Step 327, the check target list generator 115 returns to Step 322.

After the steps are finished for the pairs of all polygons (Step 327→yes) as a result of Step 327, the check target list generator 115 includes in the wire stuck surface data 129 the contents of the wire stuck surface intermediate data 128 (Step 328).

Subsequently, the check target list generator 115 determines whether the wire stuck surface determination step is finished for all pairs of the component models in the component list data (Step 329). Further, in Step 327, the check target list generator 115 may determine whether the wire stuck surface determination step is finished only for the pair of adjacent component models.

If the determination is not finished for all pairs (Step 329→No) as a result of Step 329, the check target list generator 115 returns to Step 321.

If the determination is finished for all pairs (Step 329→Yes) as a result of Step 329, the processor 100 returns to S105 in FIG. 6.

FIG. 19 shows an example of wire stuck surface data according to the present embodiment.

The wire stuck surface data 129 has a wire stuck surface identification number, the first component identification number, the second component identification number, and paired polygons information.

The wire stuck surface identification number is a number assigned by the check target list generator 115 to each of the wire stuck surfaces. Further, the wire stuck surfaces which are continuous between polygons on the same component are assigned the same wire stuck surface identification number.

The first and the second component identification numbers are component identification numbers of the two component models which have been determined by the check target list generator 115 that the sticking could occur.

The paired polygons information is information indicating a pair of polygons which have been determined by the check target list generator 115 to constitute a wire stuck surface. When polygons overlap partially with each other, the coordinates of the overlapping surface may be added to the paired polygons information.

(Check Pair List Data Generation Steps 105)

FIG. 20 is a flowchart showing a procedure of the check pair list data generation step according to the present embodiment. Further, the check pair list data generation step shown in FIG. 20 corresponds to S105 in FIG. 6.

Firstly, the check pair list generator 117 adds all combinations of wiring models and edge models to the check pair list data 130 (Step 401). Here, the edge model corresponds to information included in the edge data 127 (FIG. 15). In Step 401, the check pair list generator 117 includes the identification numbers of the wiring models (wiring identification number) in the wiring identification number of the check pair list data 130, and includes the edge identification numbers of the edge models in the check target identification number of the check pair list data 130 (refer to FIG. 21).

Next, the check pair list generator 117 adds all of the combinations of the wiring models and wire stuck surface models to the check pair list data 130 (Step 402). Here, the wire stuck surface model corresponds to information included in the wire stuck surface data 129 (FIG. 19). In Step 402, the check pair list generator 117 includes the identification numbers of the wiring models (wiring identification numbers) in the wiring identification number of the check pair list data 130, and includes the wire stuck surface identification numbers of the wire stuck surface models in the check target identification number of the check pair list data 130 (refer to FIG. 21).

FIG. 21 shows an example of the check pair list data according to the present embodiment. FIG. 21A is the check pair list data 130 after the step shown in FIG. 20 (check pair list data generation step) is finished, and FIG. 21B is the check pair list data 130 after Step 508 shown in FIG. 22 is finished (before a shielding check is started).

As shown in FIG. 21, the check pair list data 130 includes a wiring identification number, a check target identification number, a division unit identification number, a wiring side polygon identification number, a wiring side coordinate, a check target side polygon identification number, and a check target side coordinate which are associated with each other. Hereinafter, the information on division unit identification number, the wiring side polygon identification number, the wiring side coordinates, the check target side polygon identification number, and the check target side coordinates are collectively referred to as the shortest distance information as appropriate.

Here, the check target identification number is an edge identification number in the edge data 127 (FIG. 15) and a wire stuck surface identification number in the wire stuck surface data 129 (FIG. 19).

The shortest distance information (the division unit identification number, the wiring side polygon identification number, the wiring side coordinates, the check target side polygon identification number, and the check target side coordinates) is information included after the specification of the shortest distance point described later, and each of the information will be described later.

Further, as shown in FIG. 21A, the shortest distance information is not entered in Step 402.

(Clearance Checking Step)

Figure 23:
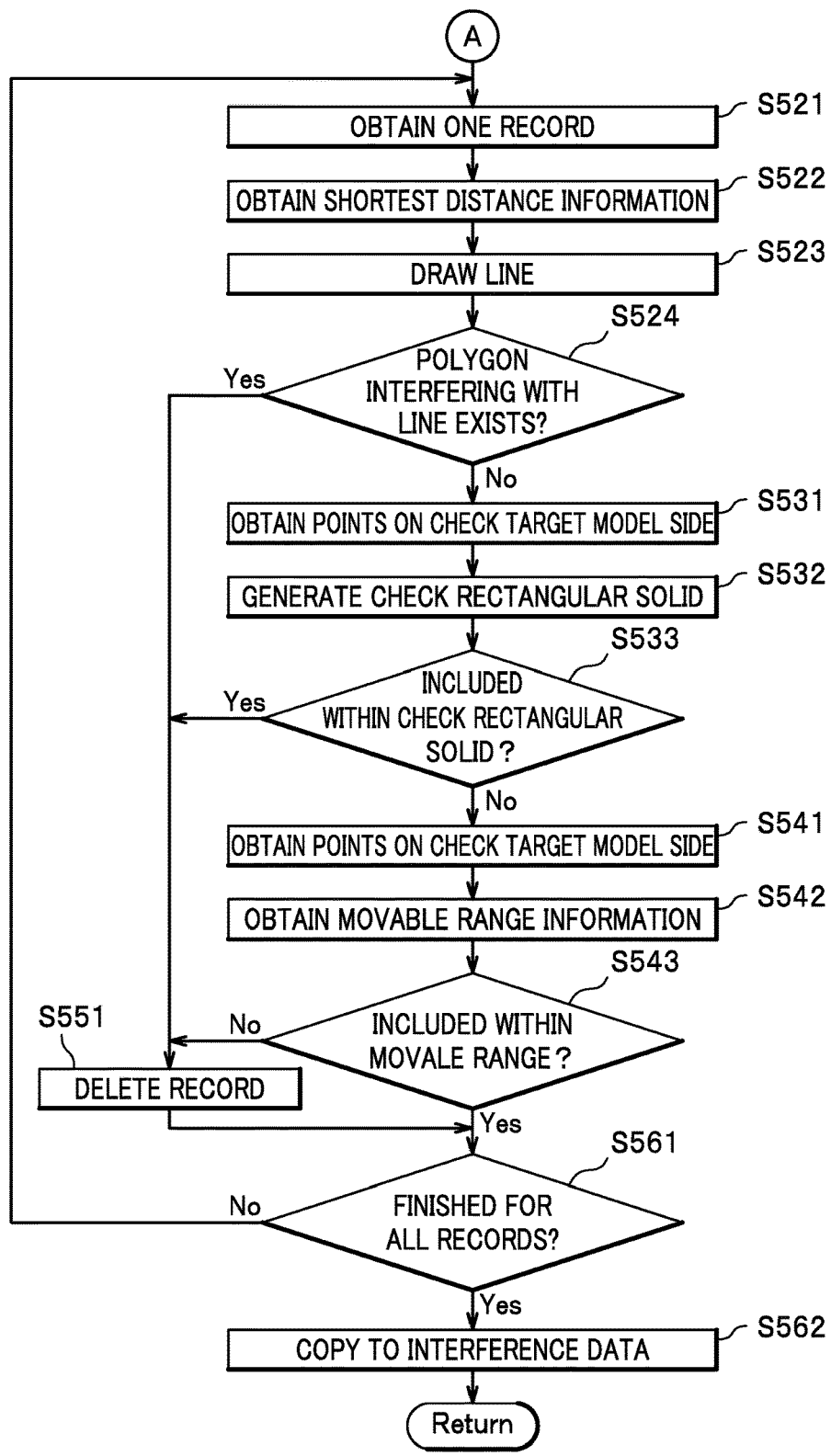
FIG. 23 is a flowchart showing a procedure of clearance checking step according to the present embodiment (Part 2).

FIG. 22 and FIG. 23 are flowcharts indicating the procedures of clearance checking step according to the present embodiment. The clearance checking step shown in FIG. 22 and FIG. 23 corresponds to S106 in FIG. 6.

Firstly, the clearance check unit 118 obtains an unprocessed record from the check pair list data 130 (FIG. 21) (Step 501).

Further, the clearance check unit 118 calculates a rectangular solid (referred to as a check rectangular solid hereinafter) including the check rectangular solid including the movable range of the wiring model corresponding to the wiring identification number included in the obtained record and a check target model (Step 502). Here, the check target model is a model corresponding to the check target identification number included in the obtained record.

Figure 24:
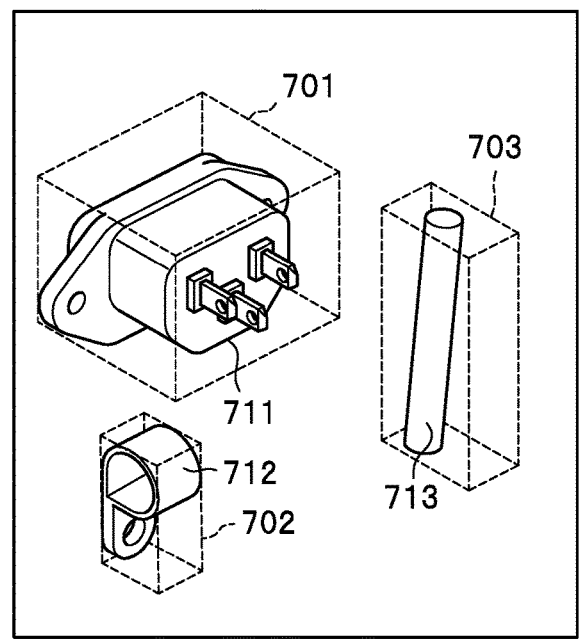
FIG. 24 is a drawing of an example of a check rectangular solid according to the present embodiment.

FIG. 24 shows an example of the check rectangular solid according to the present embodiment.

As shown in check rectangular solids 701 to 703 in FIG. 24, the check rectangular solid is a rectangular solid including each of component models 711 and 712 and a wiring model 713.

Further, it can be set by the user how much the check rectangular solids 711 to 713 are capable of leaving room relative to each of the component models 711 and 712 and the wiring model 713. Such a setting is included in the setting data 122.

FIG. 22 will be described again.

After Step 502, the clearance check unit 118 determines whether the check rectangular solids calculated in Step 502 interfere with each other (Step 503). Here, the reason for checking a presence/an absence of the interference of the check rectangular solids is to exclude from the target of clearance checking described later the wiring model and the check target model (component model having the edge or the wire stuck surface) which are away from each other. This enables a step efficiency to be improved.

If the check rectangular solid being a movable range and the check rectangular solid being a check target model don't interfere with each other (Step 503→No) as a result of Step 503, the clearance check unit 118 deletes (Step 507) a record to be processed from the check pair list data 130 to advance to Step 508.

If there is an interference section between the check rectangular solid being the movable range and the check rectangular solid being the target model (Step 503→Yes) as a result of Step 503, the clearance check unit 118 divides the wiring model by a predetermined length (Step 504). In a wiring model, each of the divided models in a wiring model is referred to as division unit. Further, the clearance check unit 118 adds records to be processed by the number of generated division units in the interference check data 130 as indicated by signs 801 to 803 in FIG. 21B to include the identification numbers of division units (division unit identification numbers) in each of the added records.

Furthermore, the clearance check unit 118 specifies the point at which the distance between the division unit to be processed and the check target model is the shortest (the shortest distance point) (Step 505). The specification of the shortest distance point is a known technique, thus description is omitted here. Additionally, the information specified here is a wiring side polygon, wiring side coordinates, a check target side polygon, check target side coordinates.

Next, the clearance check unit 118 includes the shortest distance information as a result of step in the check pair list data 130 (Step 506).

As a result, the information is included in the shortest distance information in check pair list data 130 as shown in FIG. 21B.

Figure 25:
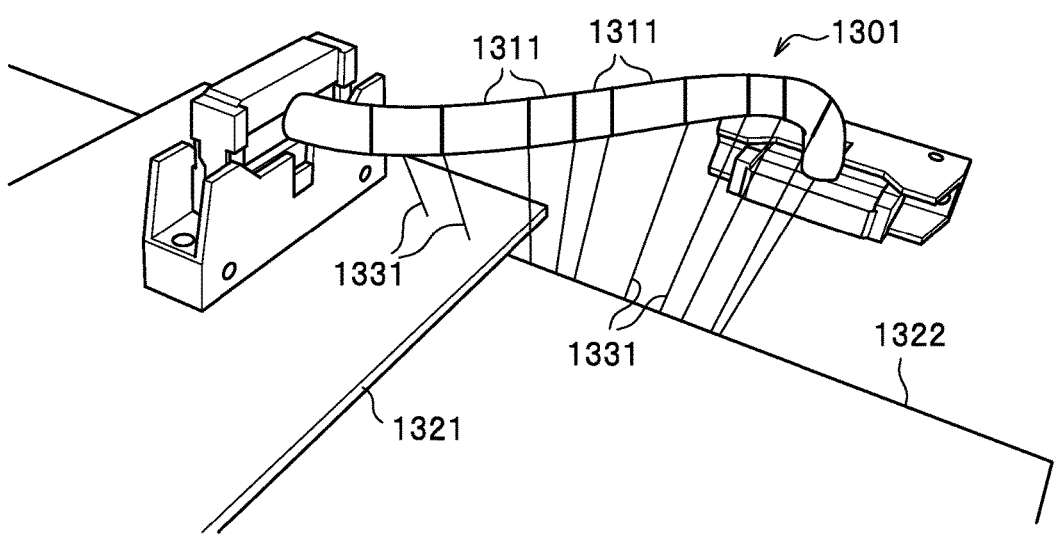
FIG. 25 is a drawing of an example of the shortest distance according to the present embodiment.

FIG. 25 describes the shortest distance point according to the present embodiment.

As shown in FIG. 25, a wiring model 1301 is divided into a plurality of division units 1311. Further, lines 1331 indicating the shortest distances from each of the division units 1311 to component models 1321 and 1322 are shown. The coordinates on the side of the wiring model 1301 among endpoints of each of the lines 1331 are wiring side coordinates in the check pair list data 130, and the polygons to which the wiring side coordinates belong are wiring side polygons. Similarly, the coordinates on the side of check targets (component models 1321 and 1322) among endpoints of each of the lines 1331 are check target coordinates, and the polygons to which the check target side coordinates belong are check target side polygons.

FIG. 22 will be described again.

After determined as "No" in Step 503 or after Step 506, the clearance check unit 118 determines whether the steps in Step 501 to Step 507 are finished for all records of the check pair list data 130 (Step 508).

If the steps are not finished for all records (Step 508→No) as a result of Step 508, the clearance check unit 118 returns to Step 501.

After the steps are finished for all records (Step 508→Yes) as a result of Step 508, the clearance check unit 118 advances to Step 521 in FIG. 23.

(Shielding Check)

In Step 508, after determined as "Yes", the clearance check unit 118 obtains one record from the check pair list data 130 (Step 521 in FIG. 23)

Further, the clearance check unit 118 obtains the shortest distance information (a division unit identification number, a wiring side polygon identification number, wiring side coordinates, a check target side polygon identification number, and check target side coordinates) (Step 522).

Next, the clearance check unit 118 draws the line connecting the wiring side coordinates and the check target side coordinates included in the obtained shortest information on the three-dimensional model data 121 (Step 523).

Further, the clearance check unit 118 determines whether there are polygons interfering with the drawn lines on the three-dimensional model data 121 (Step 524).

Step 523 and Step 524 will be descried with reference to FIG. 26.

Figure 26A:
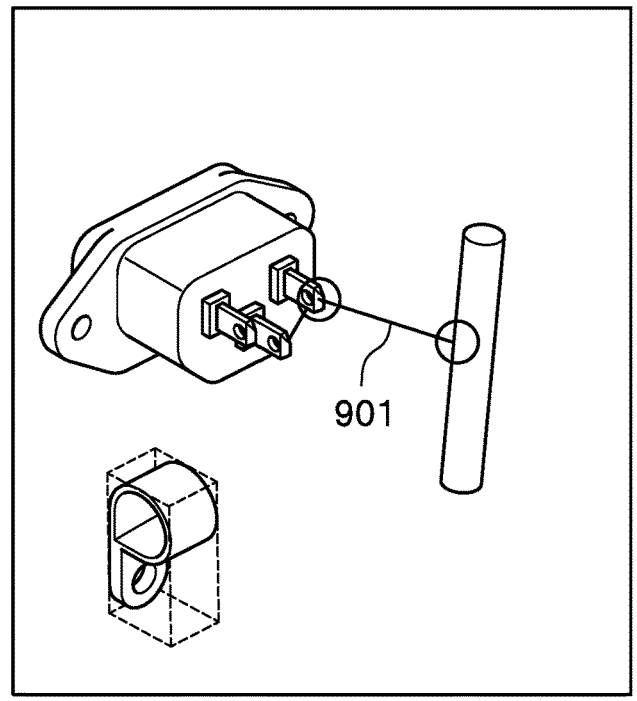
FIG. 26A is a drawing showing there are not polygons interfering with a drawn line.
Figure 26B:
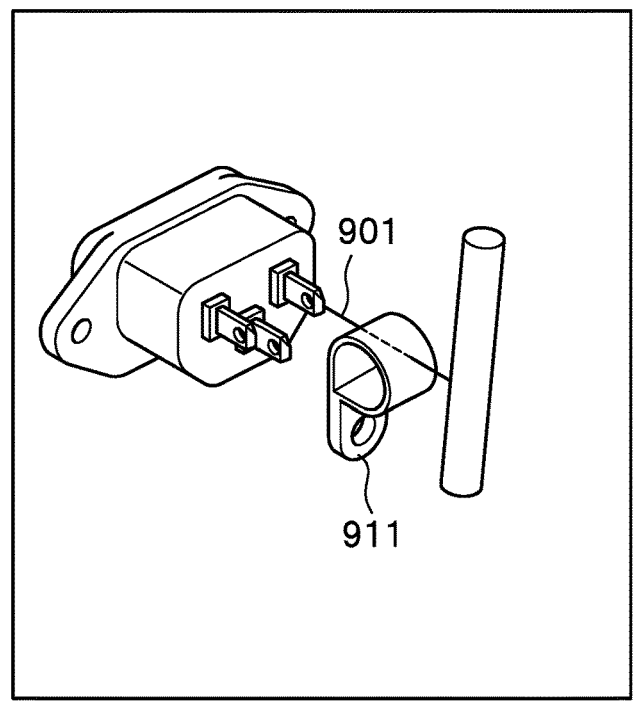
FIG. 26B is a drawing showing there are polygons interfering with the drawn line.

FIG. 26 shows a shielding check method according to the present embodiment, and FIG. 26A shows the case where there are no polygons interfering with drawn lines, while FIG. 26B shows the case where there are polygons interfering with drawn lines.

A line 901 in FIG. 26A and FIG. 26B is the line drawn in Step 523.

Further, in FIG. 26A there are no component models (polygons) interfering with the line 901. In this case, the clearance check unit 118 determines "No" in Step 524.

Furthermore, in FIG. 26B there is a component model 911 (a polygon of a component model 911) interfering with the line 901. In this case, the clearance check unit 118 determines "Yes" in Step 524.

FIG. 23 will be described again.

If there are interfering polygons (Step 524→Yes) as a result of Step 524, the clearance check unit 118 deletes the record to be processed (Step 551) from the check pair list data 130 to advances to Step 561. This means that, though there is a risk that a wiring could interfere with an edge and a wire stuck surface, there is a component between a wiring and an edge or a wire stuck surface, thus it is determined that there is no risk of interference.

If there are no interfering polygons (Step 524→No) as a result of Step 524, the clearance check unit 118 obtains the point on the side of the check target model (namely, the point indicated by check target side coordinate) out of the two points of the shortest distance information obtained in Step 521 (Step 531). In other words, the information actually obtained in Step 531 is check target side coordinate.

Next, the clearance check unit 118 generates check rectangular solids on the three-dimensional model data 121 for fastener models and the component models included in the excluded component list data (Step 532).

Further, the clearance check unit 118 determines whether the point obtained in Step 531 is included in the check rectangular solid generated in Step 532 (Step 533).

If the point is included in the check rectangular solid (Step 533→Yes) as a result of Step 533, the clearance check unit 118 deletes the record to be processed from the check pair list data 130 (Step 511) to advances to Step 561. This means that if an edge and a wire stuck surface are close to fasteners and excluded components, there is little chance that the edge and the wire stuck surface could interfere with the wiring.

If the point is not included in the check rectangular solid (Step 533→No) as a result of Step 533, the clearance check unit 118 obtains the point which belongs to the side of the check target model (namely, the point indicated by check target side coordinate) out of the two points of the shortest distance information included in the record obtained in Step 521 (Step 541). In other words, the information obtained actually in Step 541 is check target side coordinate.

Subsequently, the clearance check unit 118 obtains the movable range information on the wiring model included in the record obtained in Step 521 from the movable range list data 125 (FIG. 10).

Next, the clearance check unit 118 determines whether the point obtained in Step 541 is included in the movable range in Step 542 (Step 543).

If the point is not included in the movable (Step 543→No) as a result of Step 543, the clearance check unit 118 deletes the record to be processed from the check pair list data 130 (Step 551).

If the point is included in movable range (Step 543→Yes) as a result of Step 543, the clearance check unit 118 determines whether the steps from Step 521 to Step 524, from Step 531 to Step 533, from Step 541 to Step 543, and Step 551 are finished for all records in the check pair list data 130 (Step 561).

If the steps are not finished for all records (Step 561→No) as a result of Step 561, the clearance check unit 118 returns to Step 521.

After the steps are finished for all records (Step 561→Yes) as a result of Step 561, the clearance check unit 118 copies the contents of the check pair list data to the interference data 131 (Step 562), and the processor 100 returns to S107 in FIG. 6.

The contents of the interference data 131 is obtained by deleting from the check pair list data 130 in FIG. 21 the record which has been determined that the interference doesn't occur, thus here illustration and description are not given.

(Interference Check Result Screen)

Figure 27:
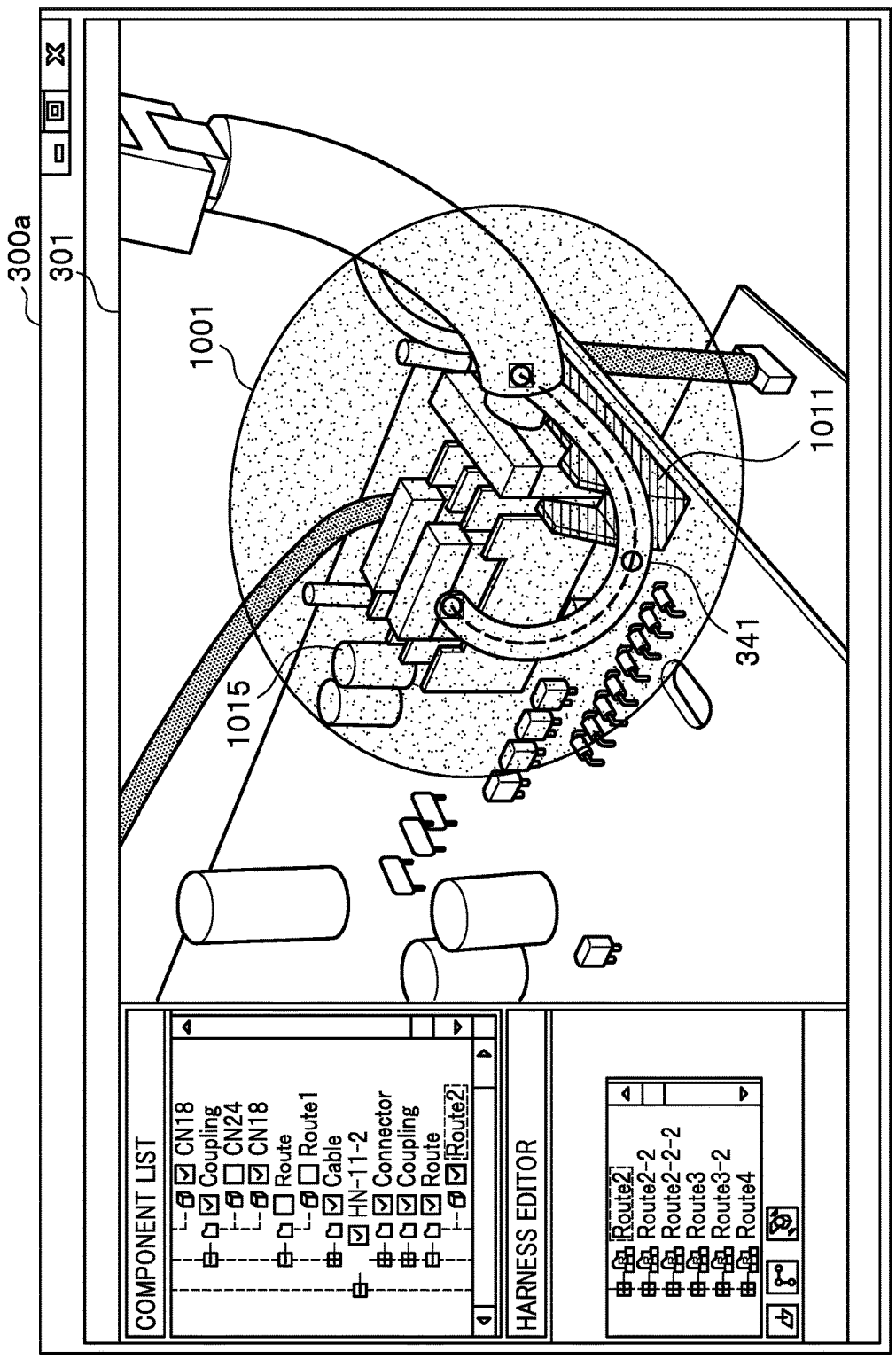
FIG. 27 is a drawing showing an example of an interference check result display according to the present embodiment.

FIG. 27 shows the example of an interference check result screen according to the present embodiment.

A three-dimensional model display screen 300a as an interference check result screen has the same configuration as the three-dimensional model display screen 300 shown in FIG. 4, thus concerning the same configurations as the three-dimensional model display screen 300 the sign and description are not given.

In the three-dimensional model display unit 301 of the three-dimensional model display screen 300a, the movable range of the wiring model 322 is displayed as a rotation ellipse body 1001. For example, when the user clicks or right-clicks the wiring model 322 through a mouse (input device 25) and then selects "display movable range", a rotation ellipse body 1001 is displayed. The movable range list data 125 is referred by the display step unit 212 so that the rotation ellipse body 1001 is displayed.

Further, the section (edge) in which the interference with the wiring model 322 could occur is highlighted. The interference data 131 is referred by the display step unit 212 so that this highlight is displayed.

Besides this, the shortest distance information on the interference data 131 is referred by the display step unit 212 so that the shortest distance line may be displayed.

Figure 28:
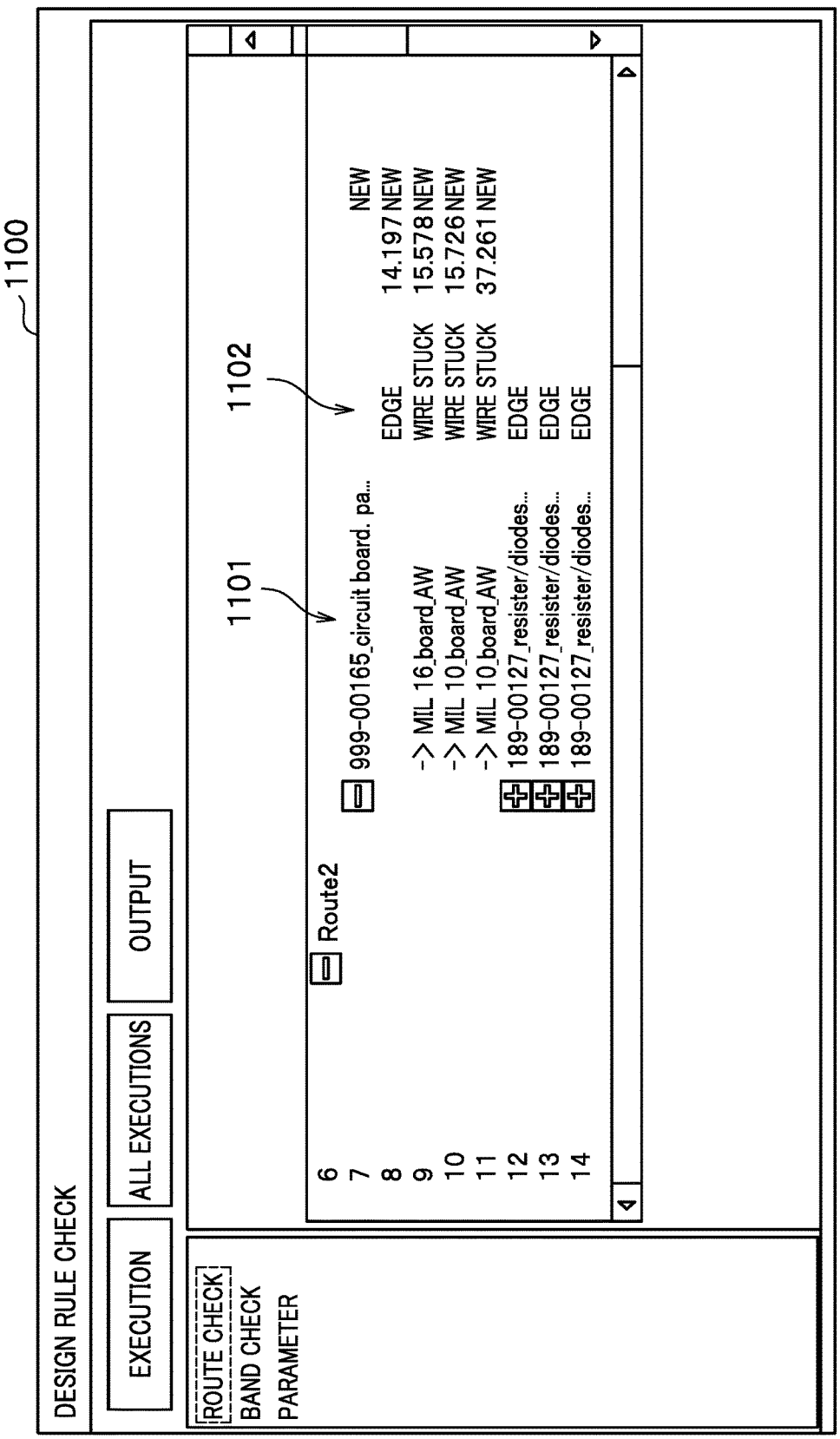
FIG. 28 is a drawing showing a further example of an interference check result display according to the present embodiment.

FIG. 28 shows a further example of the interference check result screen according to the present embodiment.

An interference check result screen 1100 is displayed when "display component information" or the like are selected and input from right-clicking in the three-dimensional model display screen 300a in FIG. 27.

In the interference check result screen 1100 there are the component names of a wiring model (included as attribute information in the three-dimensional model data 121) as indicated by a sigh 1101 and the interference forms (edge, wire stuck) which can occur in the wiring model as indicated by a sign 1102 displayed.

In the present embodiment, wiring identification number, checked identification number, and the shortest distance information are included in the interference data 131, however, besides these, the information on the region included in a movable range (rotation ellipse body) may be included in the check target model. Alternatively, when the interference check screen is displayed by the display processor 212 of the client terminal 2, the section included in the movable range of the check target model may be highlighted.

Figure 29:
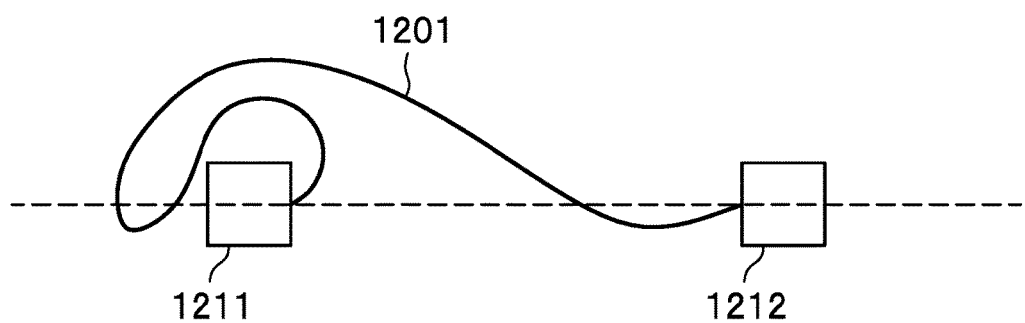
FIG. 29 is a drawing showing a wiring interferes with an extension of a straight line connecting endpoints.

If a wiring is long enough as shown in FIG. 29, a wiring 1201 could interfere with the extended line connecting endpoints 1211 and 1212. In the technique disclosed in Japanese Patent Application Nos. 4641033 and 4928528, each of the nodes is located as a vertex of a triangle having a straight line connecting the constraint points (fixing tools) which constrain the wire harness as a base side, and lengths of lines on both sides of each of the nodes as two sides so that the movable range of a wire harness (wiring) is calculated. However, this method cannot be applied into the case as shown in FIG. 29.

On the other hand, according to the present embodiment, with two fixed points in a wiring model as focal points, the set of predetermined points (rotation ellipse body) such that the sum of the distance from one of the focal points to a predetermined point and the distance from the other of the focal points to the predetermined point is the length of a wiring model is set as the movable range of a wiring. Thereby, the interference check system Z according to the present embodiment is applied into the case as shown in FIG. 29.

Further, according to the present embodiment, whether a wiring interferes with other component models is checked by using the movable range of the calculated wiring so that it becomes possible to perform the interference check between the wiring and the components using the movable range of the calculated wiring without manual operation.

Further, the interference check system Z determines whether an edge made by the first surface and the second surface has the angle which is a predetermined angle or less and a movable range interfere with each other. Thereby, it is possible to easily perform the interference check between the edge which could cut or damage the wiring and the wiring.

Furthermore, the interference check system Z according to the present embodiment, in a wire stuck surface in which the distance between the first surface constituting the first component model and the second surface constituting the second component model that is different from the first component model is a predetermined value or less, determines whether the wire stuck surface and the movable range interfere with each other so as to determine whether the set movable range interferes with the first component model. Thereby, the interference check system Z according to the present embodiment performs interference check easily between the wire stuck surface which could damage and cut the wiring as a result of sticking the wiring and the wiring.

Additionally, the interference check system Z according to the present embodiment determines whether the second component model that is different from the first component model exists between the wiring model and the first component model, if the second component model exists, and doesn't determine whether the set movable range interferes with the first component model that is different from the wiring model. Thereby, if the other component exists between the wiring and the component subject to the interference check, it is determined that the wiring and the component subject to the interference check could not interfere with each other. Thereby, the interference check closer to a real wiring state may be performed.

REFERENCE SIGNS LIST

1 Server
2 Client terminal

100 Processor (Server)
112 Reading unit
113 Movable range list generator (Movable range setting unit)
114 Movable range calculator
115 Check target list generator
116 Edge detector
117 Check pair list generator
118 Clearance check unit
121 Three-dimensional model data
122 Setting data
123 Excluded component list data
124 Wiring list data
125 Movable range list data
126 Edge intermediate data
127 Edge data
128 Wire stuck surface intermediate data
129 Wire stuck surface data
130 Check pair list data
131 Interference data
200 Processor (Client terminal)
212 Display processor
Z Interference check system

What is claimed is:

1. An interference check system, comprising:
a processor,
wherein the processor is configured to execute:
a movable range calculation process that sets as focal points two fixed points in a wiring model, the wiring model being a three-dimensional shape model for a wiring in a three-dimensional model data, to sum a distance from one of the focal points to a predetermined point and a distance from another of the focal points to the predetermined point, and to generate a set of the predetermined points such that the sum is a length of the wiring model;
a movable range set process that sets an inside of the set of the predetermined points to a movable range of the wiring;
a display process that displays the set movable range on a display unit;
a clearance check process that determines whether the set movable range interferes with a first component model that is different from the wiring model, and if an interference occurs as a result of the determination, to include information on the interference in a storage unit; and
a display process that has the information on the interference displayed on the display unit, wherein
in the clearance check process in the three-dimensional model data, in a wire stuck surface in which the distance between a first surface constituting the first component model and a second surface constituting a second component that is different from the first component model is a predetermined value or less, whether the wire stuck surface and the movable range interfere with each other is determined, so that whether the set movable range interferes with the first component model is determined.

2. The interference check system according to claim 1, wherein in the clearance check process, in the three-dimensional model data, in an edge made by a first surface constituting the first component model and a second surface has an angle which is a determined angle or less, whether the detected edge and the movable range interfere with each other is determined so that whether the set movable range interferes with the first component model is determined.

3. The interference check system according to claim 1, wherein the clearance check process determines whether a second component model that is different from the first component model exists between the wiring model and the first component model, and if the second component model exists, the clearance check process doesn't determine whether the set movable range interferes with the first component model that is different from the wiring model.

* * * * *